(12) United States Patent
Takagi

(10) Patent No.: US 11,839,973 B2
(45) Date of Patent: Dec. 12, 2023

(54) CONTINUUM ROBOT CONTROL SYSTEM AND CONTINUUM ROBOT CONTROL METHOD

(71) Applicant: CANON KABUSHIKI KAISHA, Tokyo (JP)

(72) Inventor: Kiyoshi Takagi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 176 days.

(21) Appl. No.: 17/371,456

(22) Filed: Jul. 9, 2021

(65) Prior Publication Data
US 2021/0402592 A1    Dec. 30, 2021

Related U.S. Application Data

(62) Division of application No. 15/953,034, filed on Apr. 13, 2018, now Pat. No. 11,084,166.

(30) Foreign Application Priority Data

Apr. 21, 2017    (JP) .................................. 2017-084877

(51) Int. Cl.
*B25J 18/06*    (2006.01)
*B25J 9/10*    (2006.01)

(52) U.S. Cl.
CPC ............ *B25J 9/104* (2013.01); *B25J 18/06* (2013.01); *Y10S 901/09* (2013.01); *Y10S 901/21* (2013.01); *Y10S 901/27* (2013.01)

(58) Field of Classification Search
CPC ......... B25J 9/104; B25J 18/06; Y10S 901/09; Y10S 901/21; Y10S 901/27

USPC ......................................................... 700/253
See application file for complete search history.

(56) References Cited

U.S. PATENT DOCUMENTS

| 9,044,860 B2 | 6/2015 | Takagi |
| 9,050,724 B2 | 6/2015 | Takagi |
| 9,346,161 B2 | 5/2016 | Kose |
| 9,427,870 B2 | 8/2016 | Takagi |
| 9,579,791 B2 | 2/2017 | Takagi |

(Continued)

FOREIGN PATENT DOCUMENTS

| JP | H01-177988 A | 7/1989 |
| JP | 2004-507370 A | 3/2004 |

(Continued)

OTHER PUBLICATIONS

Japanese Office Action dated Jun. 7, 2022 during prosecution of related Japanese Application No. 2021-121563 (English translation available).

*Primary Examiner* — B M M Hannan
(74) *Attorney, Agent, or Firm* — VENABLE LLP

(57) ABSTRACT

A kinematic model arithmetic portion calculates a coordinate value ($z_{e1}$ ($\theta_e$)) as distance information indicating the distance between a member that serves as a reference surface for the curve shape of a curvable portion and a member in the curvable portion that is closest to the reference surface. A switch determination unit determines based on the coordinate value whether to drive a wire for driving the curvable portion by a drive displacement calculated for the wire along with the coordinate value by the kinematic model arithmetic portion.

6 Claims, 11 Drawing Sheets

(56) References Cited

U.S. PATENT DOCUMENTS

| | | |
|---|---|---|
| 9,597,798 B2 | 3/2017 | Takagi |
| 10,743,750 B2 | 8/2020 | Hunter |
| 10,849,699 B2 | 12/2020 | Kose |
| 2003/0229420 A1 | 12/2003 | Buckingham |
| 2004/0138530 A1 | 7/2004 | Kawai et al. |
| 2011/0295063 A1 | 12/2011 | Umemoto et al. |
| 2012/0046522 A1 | 2/2012 | Naito |
| 2012/0123441 A1 | 5/2012 | Au |
| 2012/0265007 A1 | 10/2012 | Moriyama |
| 2013/0090763 A1 | 4/2013 | Simaan et al. |
| 2013/0300537 A1 | 11/2013 | Bajo et al. |
| 2013/0338433 A1* | 12/2013 | Goldman .............. A61B 1/0052 600/102 |
| 2014/0330432 A1 | 11/2014 | Simaan et al. |
| 2016/0135909 A1* | 5/2016 | Ogawa ....................... B25J 3/04 606/130 |
| 2017/0049298 A1* | 2/2017 | Hunter ................... A61B 5/067 |
| 2017/0182659 A1 | 6/2017 | Goldman et al. |
| 2017/0360519 A1* | 12/2017 | Yorimoto ................. B25J 13/02 |
| 2018/0125593 A1 | 5/2018 | Sinibaldi et al. |
| 2018/0192854 A1* | 7/2018 | Hata .................. A61B 1/00006 |

FOREIGN PATENT DOCUMENTS

| | | |
|---|---|---|
| JP | 2014-507897 A | 2/2014 |
| WO | 2012/014532 A1 | 2/2012 |

\* cited by examiner

CONTINUUM ROBOT CONTROL SYSTEM AND CONTINUUM ROBOT CONTROL METHOD

This application is a division of U.S. application Ser. No. 15/953,034 filed Apr. 13, 2018, the contents of which are incorporated by reference herein.

BACKGROUND

Technical Field

This disclosure relates to a continuum robot control system and a continuum robot control method.

Description of the Related Art

A continuum robot includes a curvable portion, which has a flexible structure, and the shape of the continuum robot is controlled by deforming the curvable portion. Continuum robots are superior to robots made up of rigid links in mainly two respects. First, continuum robots are capable of moving along a curved line in a narrow space in which rigid-link robots may be stuck and an environment with scattered objects, and second, continuum robots, which are innately supple, can be operated without damaging a fragile object. This means that continuum robots do not always require, for example, the detection of an external force, which is required in the case of rigid-link robots.

Continuum robots are expected to make use of this characteristic in medical field applications including the sheath of an endoscope and a catheter, and applications to rescue robots and other work robots for extreme environments. Methods of driving a continuum robot include a tendon drive method, a method using a push-pull wire, and a method using a pneumatic actuator. In K. Xu, M. Fu, and J. Zhao, "An Experimental Kinestatic Comparison between Continuum Manipulators with Structural Variations," in IEEE International Conference on Robotics and Automation (ICRA), Hong Kong, China, 2014, pp. 3258-3264 (hereinafter referred to as "Xu et al."), a continuum robot is made up of: three wires; and a base disk, spacer disks, and an end disk, which guide the wires, and the shape of the continuum robot is controlled by obtaining the push-pull drive amount of the wires from a derived kinematic model.

SUMMARY

According to one embodiment of this disclosure, there is provided a continuum robot control system for controlling a continuum robot, the continuum robot including a curvable portion including: a plurality of wires extending through a reference surface; a first wire guide to which the plurality of wires are fixed and configured to guide the plurality of wires; and a second wire guide to which a part of the plurality of wires are fixed and configured to guide the plurality of wires, the second wire guide being provided between the reference surface and the first wire guide, the curvable portion being curvable by driving one of more of the plurality of wires, the continuum robot control system including: a calculation unit configured to calculate, from input of a target curve angle and a target rotation angle, a drive displacement amount of the one or more of the plurality of wires and distance information, the target curve angle being a target value of a curve angle of the curvable portion, the target rotation angle being a target value of a rotation angle of the curvable portion, the distance information indicating a distance between a proximal end, which is one of end portions of the second wire guide that is closer to the reference surface, and the reference surface; and a control unit configured to control drive of the one or more of the plurality of wires, in which the control unit includes a determination unit configured to determine, based on the distance information, whether to drive the one or more of the plurality of wires by the drive displacement amount calculated along with the distance information by the calculation unit.

Further, according to one embodiment of this disclosure, there are provided a method of controlling the continuum robot described above, and a program for causing a computer to function as the continuum robot control system described above.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In Xu et al., holes through which the wires are guided are formed near the circumference of each disk. A kinematic model in Xu et al. is derived by assuming that a virtual wire runs through the center of the continuum robot and calculating the drive amount of an actual wire so that the length of the virtual wire is constant. The continuum robot in Xu et al. consequently has a possibility that a member serving as a reference surface of the curve shape of a given curvable portion is accidentally brought into contact with a member in the given curvable portion that is closest to the reference surface.

This disclosure has been made in view of this problem, and an object of this disclosure is therefore to provide a mechanism for preventing a contact between a member serving as a reference surface of the curve shape of a curvable portion of a continuum robot and a member in the curvable portion that is closest to the reference surface when the curvable portion is driven.

Embodiments of this disclosure are described below in detail with reference to the accompanying drawings. The embodiments of this disclosure deal with an example in which a system for controlling a continuum robot (also called a continuum manipulator) is applied to a flexible endoscope. In the medical field of recent years, for example, minimally invasive medical treatment for reducing a burden on a patient and improving quality of life (QOL) after treatment or examination has been attracting attention. Surgery or examination using a flexible endoscope can be given as an example of the minimally invasive medical treatment. With a flexible endoscope, which has an insertion portion constructed from a curvable member, a wide extent can be observed thoroughly by manipulating the curve angle of a curvable portion at the tip of the endoscope. The flexible endoscope to which a continuum robot control system according to each of the embodiments of this disclosure is applied as an example is not limited to the medical field, and is applicable also to other fields (e.g., an industrial endoscope for observing the interior of a pipe or a similar space) as long as the endoscope is for observing the interior of a path into/from which a curvable portion is inserted/extracted (hereinafter referred to as "insertion/extraction path").

First Embodiment

A first embodiment of this disclosure is described first.

<Configuration Example of a Continuum Robot Control System>

Figure 1:
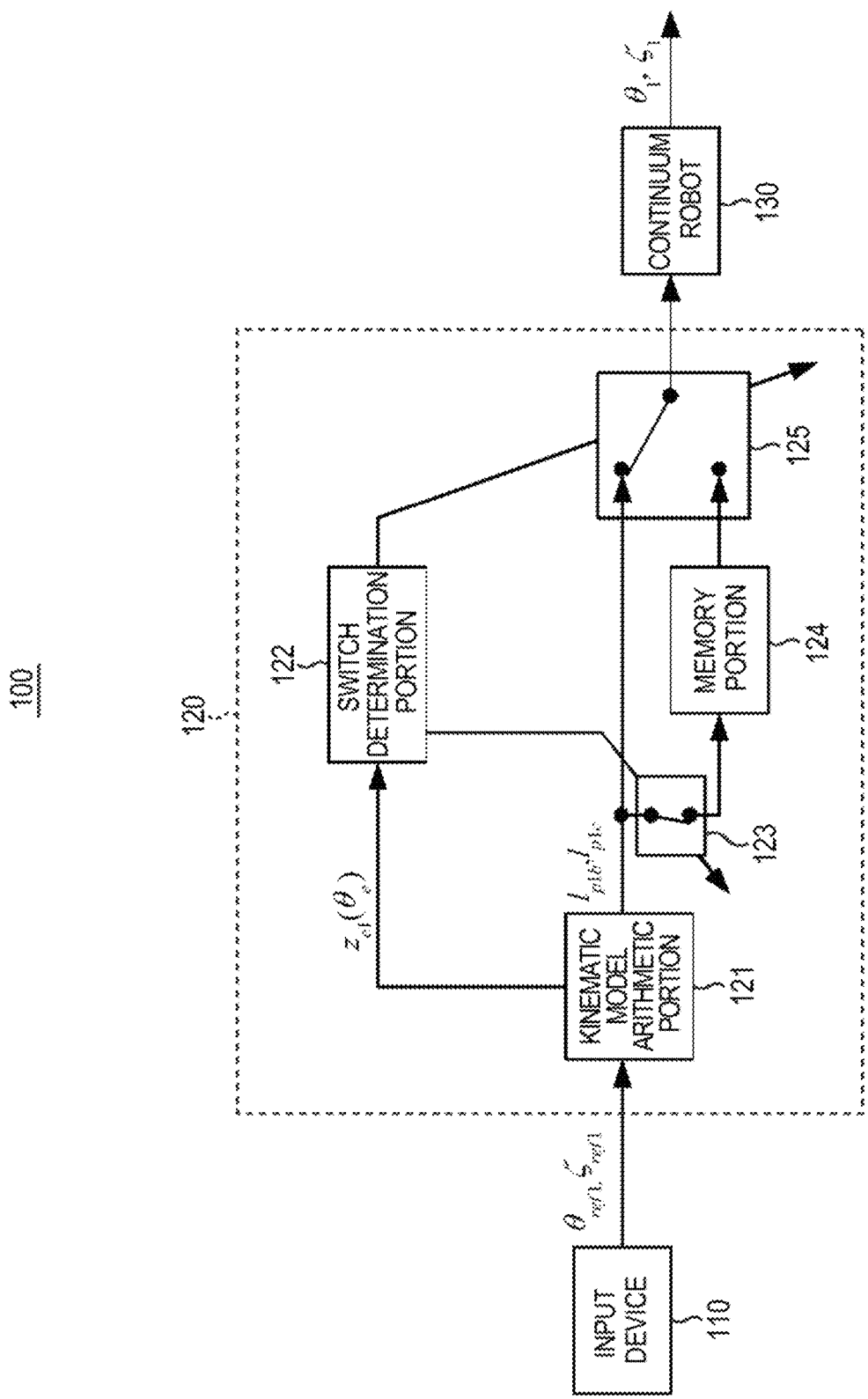
FIG. 1 is a schematic diagram for illustrating an example of the configuration of a continuum robot control system according to a first embodiment of this disclosure.

FIG. 1 is a schematic diagram for illustrating an example of the configuration of a continuum robot control system 100 according to a first embodiment of this disclosure. The continuum robot control system 100 includes, as illustrated in FIG. 1, an input device 110, a control device 120, and a continuum robot 130.

<<Configuration Example of the Continuum Robot>>

An example of the configuration of the continuum robot 130 illustrated in FIG. 1 is described first.

Figure 2:
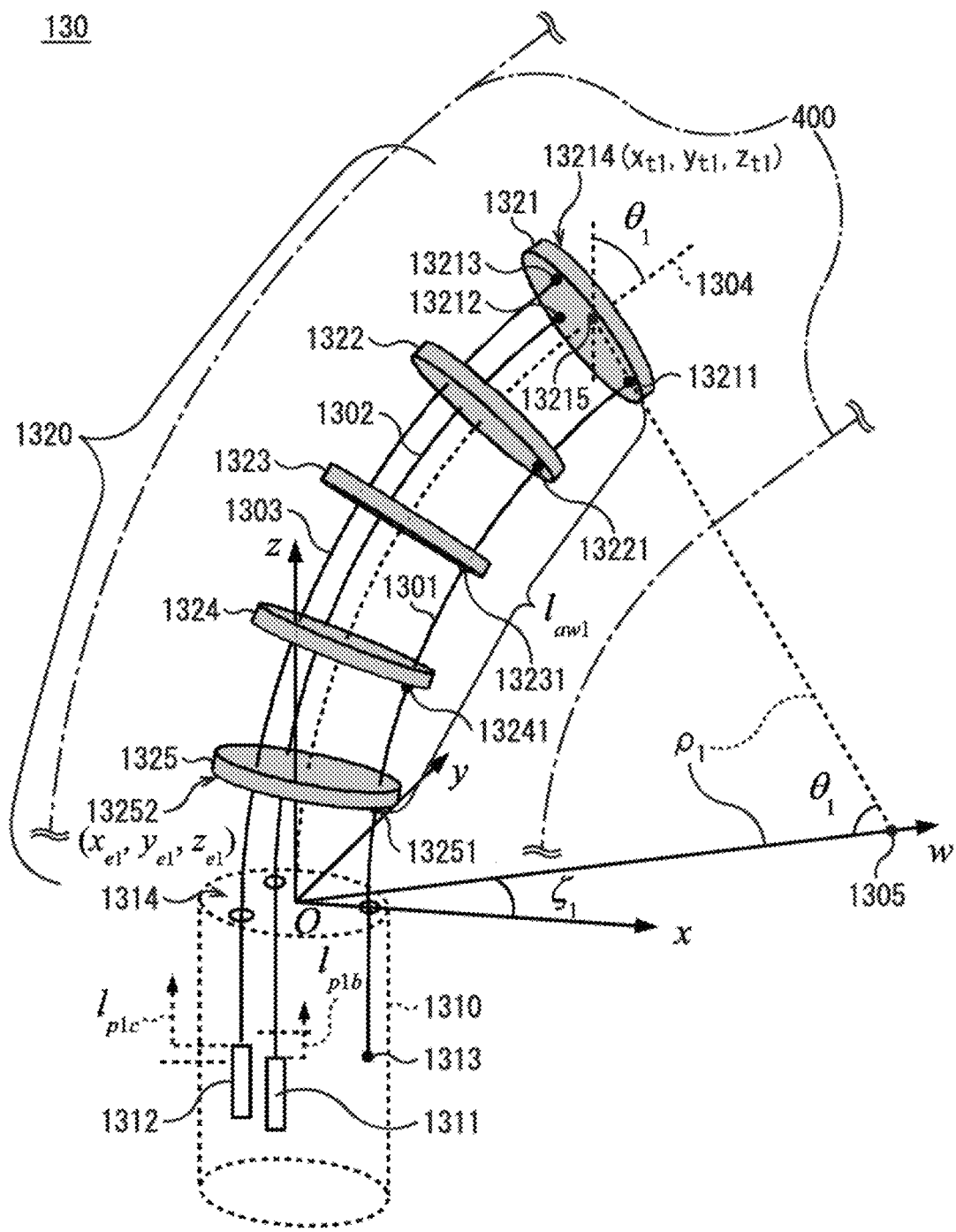
FIG. 2 is a schematic diagram for illustrating an example of the configuration of a continuum robot illustrated in FIG. 1.

FIG. 2 is a schematic diagram for illustrating an example of the configuration of the continuum robot 130 illustrated in FIG. 1. The continuum robot 130 includes, as illustrated in FIG. 2, a base unit 1310 and a curvable portion 1320. The continuum robot 130 illustrated in FIG. 2 is configured so as to be movable in a longitudinal axial direction of the curvable portion 1320.

The curvable portion 1320 includes a plurality of wires 1301 to 1303, a first wire guide 1321, and second wire guides 1322 to 1325. The plurality of wires 1301 to 1303 extend through a top surface 1314 of the base unit 1310, which serves as a reference surface of the curvable portion 1320. The first wire guide 1321 guides the plurality of wires 1301 to 1303 by fixing the plurality of wires 1301 to 1303 at different points in the first wire guide 1321. The second wire guides 1322 to 1325 are provided between the top surface 1314 of the base unit 1310 and the first wire guide 1321 to guide the plurality of wires 1301 to 1303 by fixing a part of the plurality of wires 1301 to 1303, here, the wire 1301, at predetermined points in the second wire guides 1322 to 1325. Specifically, the first wire guide 1321 has a point 13211 at which the wire 1301 is fixed, a point 13212 at which the wire 1302 is fixed, and a point 13213 at which the wire 1303 is fixed. The wire 1301 is fixed at a point 13221 in the second wire guide 1322, at a point 13231 in the second wire guide 1323, at a point 13241 in the second wire guide 1324, and at a point 13251 in the second wire guide 1325. None of the plurality of wires 1301 to 1303 are fixed to the top surface 1314 of the base unit 1310, which serves as the reference surface of the curvable portion 1320, as illustrated in FIG. 2.

The continuum robot 130 illustrated in FIG. 2 is configured so that the curvable portion 1320 can be curved into a desired curve shape (for example, an arc shape) by driving a part of predetermined wires out of the plurality of wires 1301 to 1303, here, the wires 132 and 1303.

In the following description, an end portion of each wire guide in the curvable portion on the far side from the reference surface of the curvable portion in a longitudinal axial direction of the curvable portion is referred to as "distal end", and an end portion of the wire guide on the near side from the reference surface of the curvable portion in the longitudinal axial direction is referred to as "proximal end". Specifically, the curvable portion 1320 begins from the top surface 1314 of the base unit 1310 (strictly speaking, the top surface 1314 itself is not included) and reaches a distal end 13214 of the first wire guide 1321. In the example illustrated in FIG. 2, the wires 1301, 1302, and 1303 are fixed at different points 13211, 13212, and 13213, respectively, in the distal end 13214 of the first wire guide 1321. The points 13221, 13231, 13241, and 13251 at which the wire 1301 is fixed are located in, for example, proximal ends of the second wire guides 1322, 1323, 1324, and 1325, respectively.

In the continuum robot 130 illustrated in FIG. 2, a camera (not shown) is provided at a point beyond the first wire guide 1321 on the far side from the top surface 1314, so that the interior of an insertion/extraction path 400 can be observed by inserting the curvable portion 1320 along the insertion/extraction path 400. The plurality of wire guides arranged discretely in the example of FIG. 2 may be replaced by a continuum wire guide having an accordion shape, a mesh pattern, or the like.

An actuator 1311, which is for push-pull drive of the wire 1302, an actuator 1312, which is for push-pull drive of the wire 1303, and a fixing portion 1313, which fixes one end of the wire 1301, are provided inside the base unit 1310. In other words, the continuum robot 130 illustrated in FIG. 2 is configured so that the curvable portion 1320 can be curved into a desired curve shape (for example, an arc shape) by controlling the actuator 1311 and the actuator 1312 to drive the wires 1302 and 1303.

A central axis 1304 of the continuum robot 130 (to be more exact, the curvable portion 1320 in the example of FIG. 2) is represented by the broken line in FIG. 2. In FIG. 2, the center of the top surface 1314 of the base unit 1310 serving as the reference surface of the curvable portion 1320 is set as an original O, and an x-axis and y-axis orthogonal to each other run through the original O in the plane of the top surface 1314. A z-axis orthogonal to the top surface 1314 of the base unit 1310 is also illustrated in FIG. 2. The actuator 1311 drives the wire 1302 by a drive displacement amount $l_{p1b}$, and the actuator 1312 drives the wire 1303 by a drive displacement amount $l_{p1c}$ in FIG. 2. In FIG. 2, the central axis 1304 runs through a point 13215 in the distal end 13214 of the first wire guide 1321. An angle formed at the point 13215 between the central axis 1304 and a line segment parallel to the z-axis is illustrated in FIG. 2 as a curve angle $\theta_1$ of the curvable portion 1320. In FIG. 2, a w-axis is a projection of the central axis 1304 onto an x-y plane, and a point 1305 is a projection of the point 13215 onto the x-y plane. An angle formed between the x-axis and the w-axis is illustrated in FIG. 2 as a rotation angle $\zeta_1$ of the curvable portion 1320. A curvature radius $\rho_1$ of the curvable portion 1320 with respect to the central axis 1304 is also illustrated in FIG. 2. A part of the wire 1301 that extends from the distal end 13214 of the first wire guide 1321 and ends at a proximal end 13252 of the second wire guide 1325 has a length $l_{aw1}$ in FIG. 2.

The description refers back to FIG. 1.

The input device 110 inputs a target curve angle $\theta_{ref1}$ and a target rotation angle $\zeta_{ref1}$, which are curve-shape parameters of the curvable portion 1320, to the control device 120. The target curve angle $\theta_{ref1}$ is a target value of the curve angle $\theta_1$ of the curvable portion 1320. The target rotation angle $\zeta_{ref1}$ is a target value of the rotation angle $\zeta_1$ of the curvable portion 1320. The input device 110 is configured so that the curve-shape parameters, which include the target curve angle $\theta_{ref1}$ and the target rotation angle $\zeta_{ref1}$, can be input sequentially in time series (e.g., for every predetermined discrete-time step). The curve-shape parameters input sequentially in time series by the input device 110 may include the target curve angle $\theta_{ref1}$ and target rotation angle $\zeta_{ref1}$ of different values.

The control device 120 controls drive of the continuum robot 130 based on the curve-shape parameters input from the input device 110. The control device 120 includes, as illustrated in FIG. 1, a kinematic model arithmetic portion 121, a switch determination unit 122, a first switch portion 123, a memory portion 124, and a second switch portion 125. Specifically, the control device 120 derives a model based on kinematics for the continuum robot 130 whose shape can be controlled three-dimensionally by driving two wires 1302 and 1303 out of the three wires 1301 to 1303. A model based on kinematics may herein be referred to as "kinematic model". The control device 120 performs control to avoid a contact between the top surface 1314 of the base unit 1310, which serves as the reference surface of the curvable portion 1320, and the proximal end 13252 of the second wire guide 1325, which is closest to the top surface 1314 of the base unit 1310.

The kinematic model arithmetic portion 121 calculates the drive displacement amount $l_{p1b}$ of the wire 1302 and the drive displacement amount $l_{p1c}$ of the wire 1303 from the target curve angle $\theta_{ref1}$ and target rotation angle $\zeta_{ref1}$ input from the input device 110. The kinematic model arithmetic portion 121 also calculates, from the input target curve angle $\theta_{ref1}$ and target rotation angle $\xi_{ref1}$, a coordinate value $z_{e1}$ ($\theta_e$), which is distance information indicating the distance between the proximal end 13252 of the second wire guide 1325 and the top surface 1314 of the base unit 1310. It is assumed here that the coordinate value $z_{e1}$ ($\theta_e$) indicates a value in the z-axis direction in relation to the original O of the reference surface when the original O is set as a value "0". The coordinate value $z_{e1}$ ($\theta_e$) indicates a value in the z-axis direction at every point along the outer circumference of the proximal end 13252 of the second wire guide 1325 illustrated in FIG. 2. The kinematic model arithmetic portion 121 configured to calculate the drive displacement amount $l_{p1b}$ of the wire 1302, the drive displacement amount $l_{p1c}$ of the wire 1303, and the coordinate value $z_{e1}$ ($\theta_e$), which is the distance information, is an example of a component corresponding to the "calculation unit" of this disclosure.

The switch determination unit 122 determines, from the coordinate value $z_{e1}$ ($\theta_e$) calculated by the kinematic model arithmetic portion 121, whether to drive the wire 1302 and the wire 1303 in a manner based respectively on the drive displacement amount $l_{p1b}$ and the drive displacement amount $l_{p1c}$, which are calculated along with the coordinate value $z_{e1}$ ($\theta_e$) by the kinematic model arithmetic portion 121. Specifically, the switch determination unit 122 determines whether or not the coordinate value $z_{e1}$ ($\theta_e$) is equal to or less than a threshold value, and the drive control is performed based on this determination. When the threshold value is set to 0, for example, and the coordinate value $z_{e1}$ ($\theta_e$) is equal to or less than the threshold value 0, a contact is expected to occur between the top surface 1314 of the base unit 1310 and the proximal end 13252 of the second wire guide 1325. As a way to determine whether a contact between the top surface 1314 of the base unit and the proximal end 13252 of the second wire guide 1325 is a possibility, it is preferred to set the threshold value to 0. However, this disclosure is not limited to this mode, and may also employ a mode in which a predetermined positive value is set as the threshold value by taking into consideration the safety rate related to the contact.

When the coordinate value $z_{e1}$ ($\theta_e$) is not equal to or less than the threshold value, the switch determination unit 122 determines that there is no fear of contact between the top surface 1314 of the base unit 1310 and the proximal end 13252 of the second wire guide 1325, and makes switches in the first switch portion 123 and the second switch portion 125 in the manner illustrated in FIG. 1. Specifically, the switch determination unit 122 in this case makes a switch in the second switch portion 125 in the manner illustrated in FIG. 1 to perform control so that the drive displacement amount $l_{p1b}$ and the drive displacement amount $l_{p1c}$, which are calculated along with the coordinate value $z_{e1}$ ($\theta_e$) by the kinematic model arithmetic portion 121, are output to the continuum robot 130. This causes the continuum robot 130 to drive the wire 1302 and the wire 1303 respectively by the drive displacement amount $l_{p1b}$ and the drive displacement amount $l_{p1c}$, which are calculated along with the coordinate value $z_{e1}$ ($\theta_e$) by the kinematic model arithmetic portion 121. The switch determination unit 122 in this case also makes a switch in the first switch portion 123 in the manner illustrated in FIG. 1 to perform control so that the drive displacement amount $l_{p1b}$ and the drive displacement amount $l_{p1c}$, which are calculated along with the coordinate value $z_{e1}$ ($\theta_e$) by the kinematic model arithmetic portion 121, are stored in the memory portion 124. The memory portion 124 thus stores the drive displacement amount $l_{p1b}$ and the drive displacement amount $l_{p1c}$, which are calculated along with the coordinate value $z_{e1}$ ($\theta_e$) by the kinematic model arithmetic portion 121, when the coordinate value $z_{e1}$ ($\theta_e$) is not equal to or less than the threshold value (i.e., when it is determined that there is no fear of contact).

Meanwhile, when the coordinate value $z_{e1}$ ($\theta_e$) is equal to or less than the threshold value, the switch determination unit 122 determines that there is a fear of contact between the top surface 1314 of the base unit 1310 and the proximal end 13252 of the second wire guide 1325, and makes switches in the first switch portion 123 and the second switch portion 125 in a direction reverse to the direction illustrated in FIG. 1. In other words, the switch determination unit 122 in this case performs control so that the wire 1302 and the wire 1303 are not driven respectively by the drive displacement amount $l_{p1b}$ and the drive displacement amount $l_{p1c}$, which are calculated along with the coordinate value $z_{e1}$ ($\theta_e$) by the kinematic model arithmetic portion 121. Specifically, the switch determination unit 122 in this case first makes a switch in the first switch portion 123 in a direction reverse to the direction illustrated in FIG. 1 to perform control so that the drive displacement amount $l_{p1b}$ and the drive displacement amount $l_{p1c}$, which are calculated along with the coordinate value $z_{e1}$ ($\theta_e$) by the kinematic model arithmetic portion 121, are not stored in the memory portion 124. This ensures that the memory portion 124 stores the drive displacement amount $l_{p1b}$ and the drive displacement amount $l_{p1c}$, which are calculated along with the coordinate value $z_{e1}$ ($\theta_e$) by the kinematic model arithmetic portion 121, only when the coordinate value $z_{e1}$ ($\theta_e$) is not equal to or less than the threshold value (i.e., when it is determined that there is no fear of contact). The switch determination unit 122 in this case then makes a switch in the second switch portion 125 in a direction reverse to the direction illustrated in FIG. 1 to perform control so that the drive displacement amount $l_{p1b}$ and the drive displacement amount $l_{p1c}$, which are calculated along with the coordinate value $z_{e1}$ ($\theta_e$) by the kinematic model arithmetic portion 121, are not output to the continuum robot 130. This prevents the wire 1302 and the wire 1303 in the continuum robot 130 from being driven respectively by the drive displacement amount $l_{p1b}$ and the drive displacement amount $l_{p1c}$, which are calculated along with the coordinate value $z_{e1}$ ($\theta_e$) by the kinematic model arithmetic portion 121, with the result that the contact described above is avoided. To give a more detailed description, the switch determination unit 122 in this case makes a switch in the second switch portion 125 in a direction reverse to the direction illustrated in FIG. 1 to perform control so that the drive displacement amount $l_{p1b}$ and the drive displacement amount $l_{p1c}$ that are stored in the memory portion 124 in advance as values calculated along with the coordinate value $z_{e1}$ ($\theta_e$) by the kinematic model arithmetic portion 121 at a previous time when the coordinate value $z_{e1}$ ($\theta_e$) calculated by the kinematic model arithmetic portion 121 is not equal to or less than the threshold value (i.e., when it is determined that there is no fear of contact) are output to the continuum robot 130. This causes the continuum robot 130 to drive the curvable portion 1320 while avoiding the contact described above.

The memory portion 124 in the first embodiment stores the predetermined drive displacement amount $l_{p1b}$ and drive displacement amount $l_{p1c}$ calculated by the kinematic model arithmetic portion 121. However, this disclosure is not limited to this mode and may also employ, for example, a mode in which the drive displacement amount $l_{p1b}$ and the drive displacement amount $l_{p1c}$ that are verified to be effective in avoiding the contact described above are stored in advance instead of drive displacement amounts calculated by the kinematic model arithmetic portion 121. The switch determination unit 122 is an example of a component corresponding to the "determination unit" of this disclosure.

The kinematic model arithmetic portion 121, the switch determination unit 122, the first switch portion 123, the memory portion 124, and the second switch portion 125 of the control device 120 illustrated in FIG. 1 may be hardware components or software components. When the constituent portions 121 to 125 of the control device 120 illustrated in FIG. 1 are software components, functions of the constituent portions 121 to 125 are implemented by, for example, a CPU of a computer by executing a program stored in a ROM or other storage media.

A specific processing example of the control device 120 is described next.

In the following description, the length of the central axis 1304 from the original O to the point 13215 is a length $l_{1d}$ of the central axis of the curvable portion 1320. The length $l_{1d}$ of the central axis of the curvable portion 1320 varies depending on the curve shape of the curvable portion 1320. The coordinates of the distal end 13214 of the first wire guide 1321 are ($x_{t1}$, $y_{t1}$, $z_{t1}$). The length of the wire 1301 is $l_{1a}$. The wire 1302 and the wire 1303, which are arranged sequentially counter-clockwise in the x-y plane, have a length $l_{1b}$ and a length $l_{1c}$, respectively.

In the first embodiment, a rotation matrix around the z-axis and a rotation matrix around the y-axis are expressed by $R_z(\theta)$ and $R_y(\theta)$, respectively, as follows:

$$R_z(\theta) = \begin{bmatrix} \cos\theta & -\sin\theta & 0 \\ \sin\theta & \cos\theta & 0 \\ 0 & 0 & 1 \end{bmatrix},$$

$$R_y(\theta) = \begin{bmatrix} \cos\theta & 0 & \sin\theta \\ 0 & 1 & 0 \\ -\sin\theta & 0 & \cos\theta \end{bmatrix}$$

A kinematic model of the continuum robot in the specific processing example of the control device 120 is derived based on the following premises:

[1] The wires in the curvable portion (each curvable portion when the continuum robot has a plurality of curvable portions) are deformed at a constant curvature.

[2] Torsional deformation of the wires is not taken into consideration.

[3] The wires are not deformed in a longitudinal direction.

[4] Friction between a wire guide and a wire is not taken into consideration.

In the first embodiment, a relation between the curve angle $\theta_1$ of the curvable portion 1320 and the coordinates ($x_{t1}$, $y_{t1}$, $z_{t1}$) of the distal end 13214 of the first wire guide 1321 is derived first.

The curve angle $\theta_1$ of the curvable portion 1320 corresponds to a curve angle at the distal end 13214 of the first wire guide 1321 in a w-z plane illustrated in FIG. 2. When the coordinates of the distal end 13214 of the curvable portion 1320 in the w-z plane are given as ($w_{t1}$, $z_{t1}$), the coordinate values $w_{t1}$ and $z_{t1}$ can be expressed with the use of the curve angle $\theta_1$ of the curvable portion 1320 and the curvature radius $\rho_1$ of the curvable portion 1320, which are described above, by Expression (1) and Expression (2), respectively.

$$w_{t1} = \rho_1(1 - \cos\theta_1) \quad (1)$$

$$z_{t1} = \rho_1 \sin\theta_1 \quad (2)$$

The length $l_{1d}$ of the central axis of the curvable portion 1320, which is described above, can be expressed by Expression (3).

$$l_{1d} = \rho_1 \theta_1 \quad (3)$$

Expression (3) is substituted into Expression (1) and Expression (2) given above to derive Expression (4) and Expression (5), respectively.

$$w_{t1} = \frac{l_{1d}}{\theta_1}(1 - \cos\theta_1) \quad (4)$$

$$z_{t1} = \frac{l_{1d}}{\theta_1}\sin\theta_1 \quad (5)$$

When two wires 1302 and 1303 out of the three wires 1301 to 1303 are driven in the first embodiment, the length $l_{1d}$ of the central axis of the curvable portion 1320 fluctuates due to fluctuations of the rotation angle $\zeta_1$, and the coordinates of the distal end 13214 consequently cannot be obtained by Expression (4) and Expression (5). The length $l_{1d}$ of the central axis of the curvable portion 1320 is therefore obtained in the first embodiment by defining the arrangement of the wires 1301 to 1303 with the use of the x-y plane as illustrated in FIG. 3.

Figure 3:
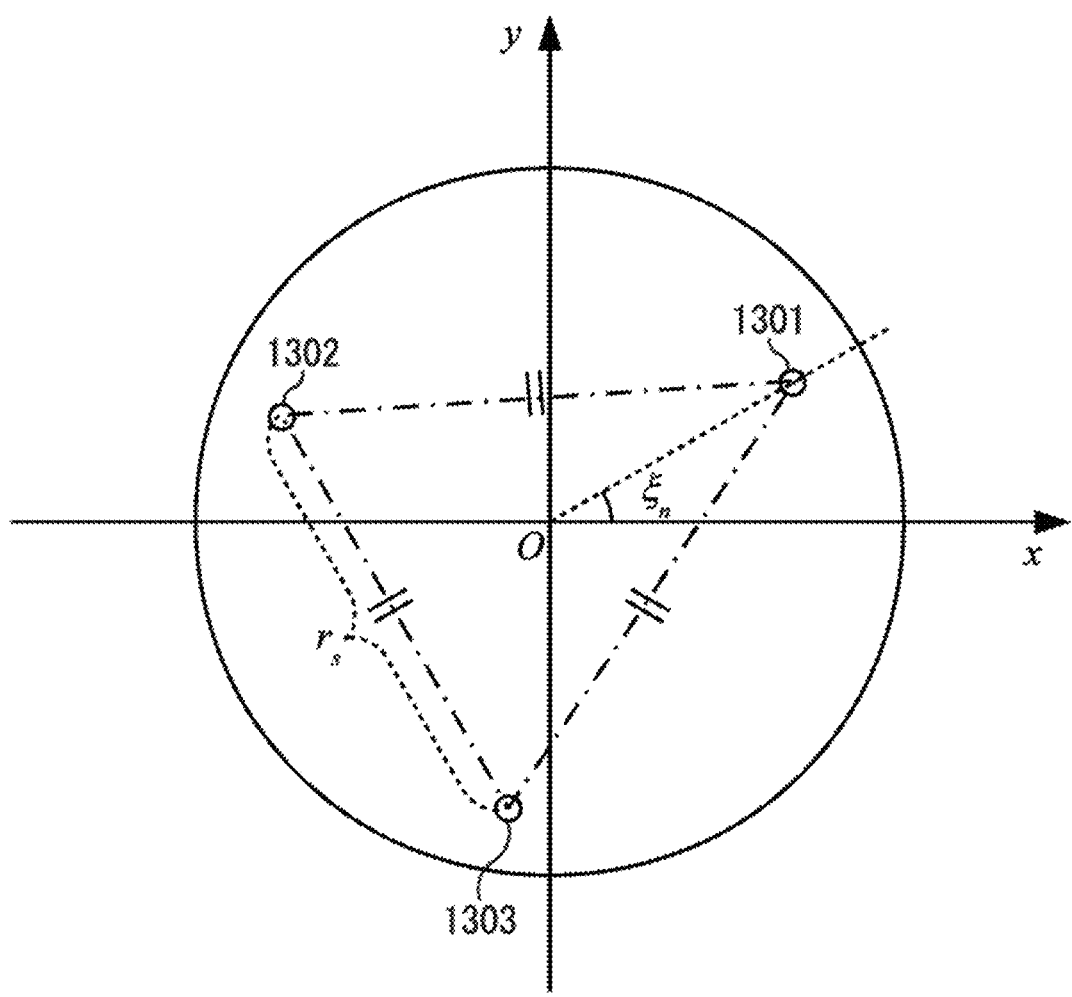
FIG. 3 is a schematic diagram for defining the arrangement of wires illustrated in FIG. 2 on an x-y plane.

FIG. 3 is a schematic diagram for defining the arrangement of the wires 1301 to 1303 illustrated in FIG. 2 on the x-y plane. In FIG. 3, the wires 1301 to 1303 are each placed at one of the vertices of a regular triangle in which each side has a length of $r_s$, and a phase angle $\xi_n$ (phase angle $\xi_1$ in the first embodiment) is an angle by which the arrangement of the wires 1301 to 1303 is determined. A value 0 is set as $\xi_1$ in the first embodiment.

A case in which the curvable portion 1320 of the continuum robot 130 is projected onto the w-z plane is considered.

Figure 4:
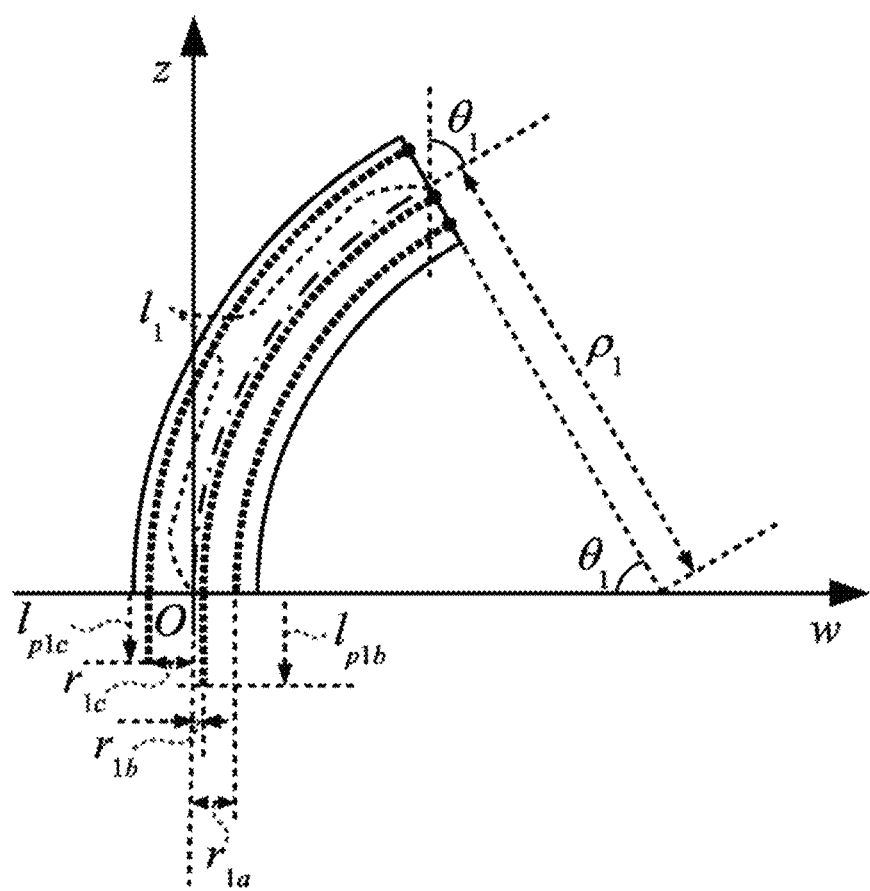
FIG. 4 is a schematic diagram for illustrating an example in which a curvable portion of the continuum robot illustrated in FIG. 2 is projected onto a w-z plane.

FIG. 4 is a schematic diagram for illustrating an example in which the curvable portion 1320 of the continuum robot 130 illustrated in FIG. 2 is projected onto the w-z plane. In FIG. 4, the same elements as those in FIG. 2 are denoted by the same reference symbols. A distance $r_{1a}$ of the wire 1301 from the original O on the w-z plane, a distance rib of the wire 1302 from the original O on the w-z plane, and a distance $r_{1c}$ of the wire 1303 from the original O on the w-z plane, which are illustrated in FIG. 4, can be expressed by Expression (6-1), Expression (6-2), and Expression (6-3), respectively.

$$r_{1a} = \frac{r_s}{\sqrt{3}}\cos\zeta_1 \quad (6-1)$$

$$r_{1b} = \frac{r_s}{\sqrt{3}}\cos\left(\frac{\pi}{3} + \zeta_1\right) \quad (6-2)$$

$$r_{1c} = \frac{r_s}{\sqrt{3}}\cos\left(\frac{\pi}{3} - \zeta_1\right) \quad (6-3)$$

The length of the wire 1301, which is a fixed wire, is invariable, and the length $l_{1a}$ of the wire 1301 can accordingly be expressed by Expression (7) from FIG. 4 and from Expression (6-1).

$$l_{1a} = (\rho_1 - r_{1a})\theta_1 = \left(\rho_1 - \frac{r_s}{\sqrt{3}}\cos\zeta_1\right)\theta_1 \quad (7)$$

This means that the length $l_{1d}$ of the central axis of the curvable portion 1320 on the w-z plane can be expressed by Expression (8).

$$l_{1d} = \rho_1\theta_1 = l_{1a} + \frac{r_s}{\sqrt{3}}\cos\zeta_1\theta_1 \quad (8)$$

Expression (8) is substituted into Expression (4) and Expression (5) given above to derive Expression (9) and Expression (10), respectively.

$$w_{t1} = \frac{l_{1a}}{\theta_1}(1 - \cos\theta_1) - \frac{r_s}{\sqrt{3}}\cos\zeta_1\theta_1 \quad (9)$$

$$z_{t1} = \left(\frac{l_{1a}}{\theta_1} + \frac{r_s}{\sqrt{3}}\cos\zeta_1\right)\sin\theta_1 \quad (10)$$

The coordinate values $(x_{t1}, y_{t1}, z_{t1})$ of the distal end 13214 of the first wire guide 1321 in an x-y-z space are accordingly expressed by Expression (11), Expression (12), and Expression (13), respectively.

$$x_{t1} = \left\{\frac{l_{1a}}{\theta_1}(1 - \cos\theta_1) - \frac{r_s}{\sqrt{3}}\cos\zeta_1\cos\theta_1\right\}\cos\zeta_1 \quad (11)$$

$$y_{t1} = \left\{\left(\frac{l_{1a}}{\theta_1} + \frac{r_s}{\sqrt{3}}\cos\zeta_1\right)\sin\theta_1\right\}\sin\zeta_1 \quad (12)$$

$$z_{t1} = \left(\frac{l_{1a}}{\theta_1} + \frac{r_s}{\sqrt{3}}\cos\zeta_1\right)\sin\theta_1 \quad (13)$$

The length $l_{1b}$ of the wire 1302 and the length $l_{1c}$ of the wire 1303 are expressed by Expression (14) and Expression (15), respectively.

$$l_{1b} = l_{1a} + (r_{1a} + r_{1b})\theta_1 = l_{1a} + r_s\cos\left(\frac{\pi}{6} + \zeta_1\right)\theta_1 \quad (14)$$

$$l_{1c} = l_{1a} + (r_{1a} + r_{1c})\theta_1 = l_{1a} + r_s\cos\left(\frac{\pi}{6} - \zeta_1\right)\theta_1 \quad (15)$$

In the first embodiment, outer circumferential coordinates $(x_{e1}, y_{e1}, z_{e1})$ of the proximal end 13252 of the second wire guide 1325, which is fixed to the wire 1301 over the length $l_{aw1}$ from the distal end 13214 of the first wire guide 1321 are obtained in addition to the central coordinates of the distal end 13214.

To obtain the coordinates, a length $l_{w1}$ is defined with the use of the length $l_{1a}$ and length $l_{aw1}$ of the wire 1301, which are described above, and an angle $\theta_{w1}$ is defined with the use of the curve angle $\theta_1$ of the curvable portion 1320, as expressed in Expression (16).

$$l_{w1} = l_{1a} - l_{aw1}, \; \theta_{w1} = \frac{l_{w1}}{l_{1a}}\theta_1 \quad (16)$$

The relation of Expression (16) is used to express central coordinates $(x_{e10}, y_{e10}, z_{e10})$ at the proximal end 13252 of the second wire guide 1352 as in Expression (17) to Expression (19).

$$x_{e10} = \left\{\frac{l_{w1}}{\theta_{w1}}(1 - \cos\theta_{w1}) - \frac{r_s}{\sqrt{3}}\cos\zeta_1\cos\theta_{w1}\right\}\cos\zeta_1 \quad (17)$$

$$y_{e10} = \left\{\left(\frac{l_{w1}}{\theta_{w1}} + \frac{r_s}{\sqrt{3}}\cos\zeta_1\right)\sin\theta_{w1}\right\}\sin\zeta_1 \quad (18)$$

$$z_{e10} = \left(\frac{l_{w1}}{\theta_{w1}} + \frac{r_s}{\sqrt{3}}\cos\zeta_1\right)\sin\theta_{w1} \quad (19)$$

Outer circumferential coordinates at the proximal end 13252 of the second wire guide 1325 are accordingly expressed by Expression (20). An angle $\theta_e$ in Expression (20) takes a range of values expressed by Expression (21).

$$\begin{bmatrix} x_{e1}(\theta_e) \\ y_{e1}(\theta_e) \\ z_{e1}(\theta_e) \end{bmatrix} = \begin{bmatrix} x_{e10} \\ y_{e10} \\ z_{e10} \end{bmatrix} + R_z(\zeta_1)R_y(\theta_1) \begin{bmatrix} r_{wg}\cos\theta_e \\ r_{wg}\sin\theta_e \\ 0 \end{bmatrix} \quad (20)$$

$$0 \leq \theta_e \leq 2\pi \quad (21)$$

The relation of the curve angle $\theta_1$ of the curvable portion 1320 to the drive displacement amount $l_{p1b}$ of the wire 1302 and the drive displacement amount $l_{p1c}$ of the wire 1303 in the curvable portion 1320 is derived next. When the curvable portion 1320 alone is considered in the w-z plane, the relation between the drive displacement amount $l_{p1b}$ of the wire 1302 and the curve angle $\theta_1$ of the curvable portion 1320, and the relation between the drive displacement amount $l_{p1c}$ of the wire 1303 and the curve angle $\theta_1$ of the curvable portion 1320 are expressed by Expression (22) and Expression (23), respectively.

$$l_{p1b} = (r_{1a} + r_{1b})\theta_1 = r_s\cos\left(\frac{\pi}{6} + \zeta_1\right)\theta_1 \quad (22)$$

$$l_{p1c} = (r_{1a} + r_{1c})\theta_1 = r_s\cos\left(\frac{\pi}{6} - \zeta_1\right)\theta_1 \quad (23)$$

The kinematic model arithmetic portion 121 receives, from the input device 110, input of the target curve angle $\theta_{ref1}$ and the target rotation angle $\zeta_{ref1}$, which are substituted for $\theta_1$ and $\zeta_1$, respectively, in Expression (22) and Expression (23), to calculate the drive displacement amount $l_{p1b}$ and the drive displacement amount $l_{p1c}$. The kinematic model arithmetic portion 121 further calculates the coordinate value $z_{e1}(\theta_e)$, which is expressed in Expression (20), by setting the length $l_{aw1}$, which is expressed in Expression (16), and using Expression (16) to Expression (20).

<Processing Step Example of a Continuum Robot Control Method>

An example of processing steps of a control method executed by the continuum robot control system 100 according to the first embodiment is described next.

Figure 5:
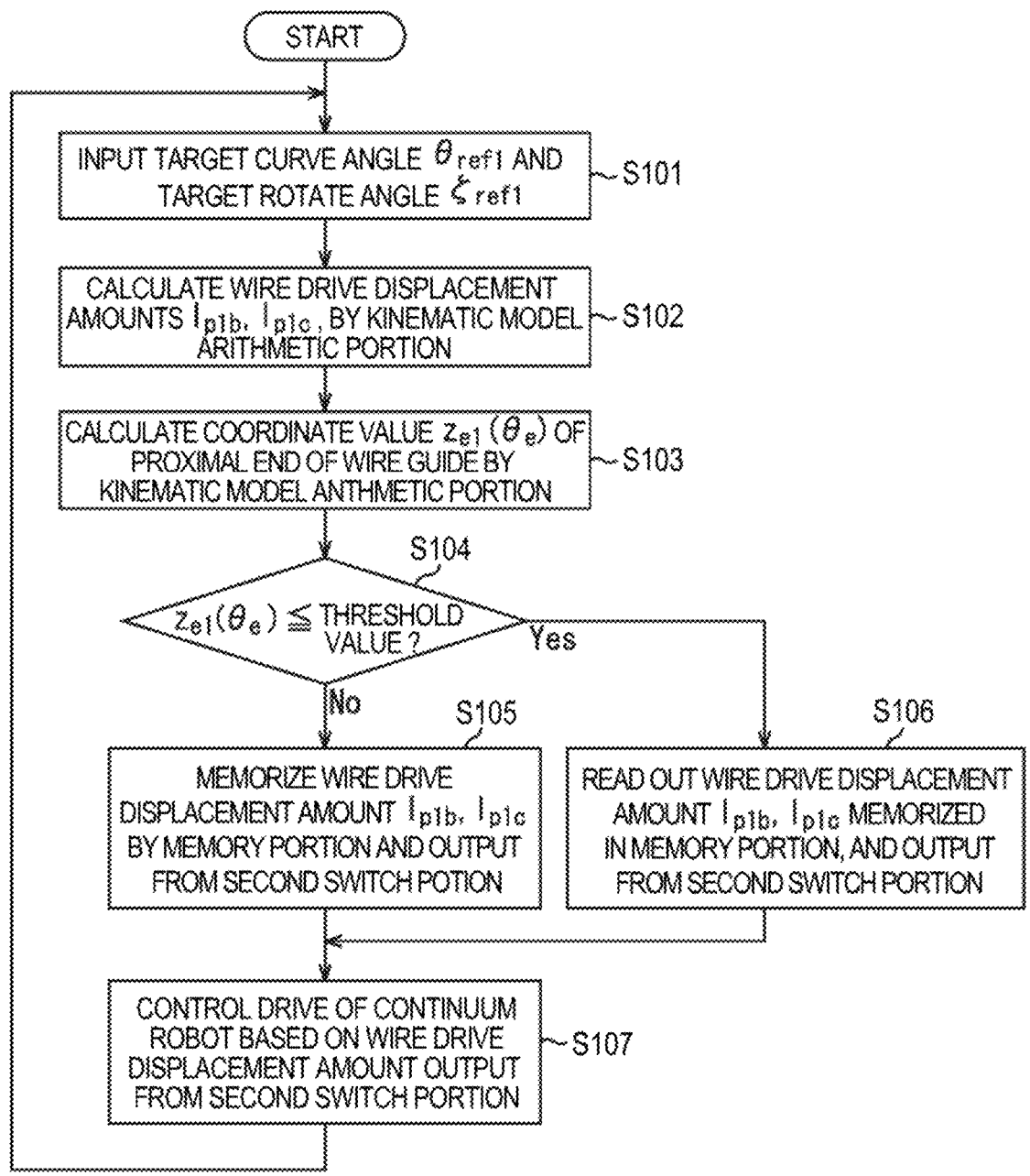
FIG. 5 is a flowchart for illustrating an example of processing steps of a control method executed by the continuum robot control system according to the first embodiment of this disclosure.

FIG. 5 is a flowchart for illustrating an example of processing steps of a control method executed by the continuum robot control system 100 according to the first embodiment of this disclosure.

First, in Step S101, the kinematic model arithmetic portion 121 receives input of the target curve angle $\theta_{ref1}$ and the target rotation angle $\zeta_{ref1}$ from the input device 110. After the target curve angle $\theta_{ref1}$ and the target rotation angle $\zeta_{ref1}$ are input from the input device 110, the processing proceeds to Step S102.

In Step S102, the kinematic model arithmetic portion 121 calculates the drive displacement amount $l_{p1b}$ of the wire 1302 and the drive displacement amount $l_{p1c}$ of the wire 1303 from the target curve angle $\theta_{ref1}$ and target rotation angle $\zeta_{ref1}$ input in Step S101.

In Step S103, the kinematic model arithmetic portion 121 subsequently calculates the coordinate value $z_{e1}(\theta_e)$, which is distance information indicating the distance between the proximal end 13252 of the second wire guide 1325 and the top surface 1314 of the base unit 1310, from the target curve angle $\theta_{ref1}$ and target rotation angle $\zeta_{ref1}$ input in Step S101.

In Step S104, the switch determination unit 122 determines whether or not the coordinate value $z_{e1}(\theta_e)$ calculated in Step S103 is equal to or less than the threshold value.

When it is determined in Step S104 that the coordinate value $z_{e1}(\theta_e)$ calculated in Step S103 is not equal to or less than the threshold value (Step S104: "No"), the processing proceeds to Step S105. The case in which the processing proceeds to Step S105 is the case in which the switch determination unit 122 determines that there is no fear of contact between the top surface 1314 of the base unit 1310 and the proximal end 13252 of the second wire guide 1325.

In Step S105, the switch determination unit 122 makes a switch in the first switch portion 123 in the manner illustrated in FIG. 1 to perform control so that the drive displacement amount $l_{p1b}$ and drive displacement amount $l_{p1c}$ calculated in Step S102 are stored in the memory portion 124 via the first switch portion 123. At the same time, the switch determination unit 122 makes a switch in the second switch portion 125 in the manner illustrated in FIG. 1 to perform control so that the drive displacement amount $l_{p1b}$ and drive displacement amount $l_{p1c}$ calculated in Step S102 are output to the continuum robot 130 via the second switch portion 125. The memory portion 124 stores the drive displacement amount $l_{p1b}$ and the drive displacement amount $l_{p1c}$ when the drive displacement amount $l_{p1b}$ and the drive displacement amount $l_{p1c}$ have values at which there is no fear of the contact described above.

When it is determined in Step S104 that the coordinate value $z_{e1}(\theta_e)$ calculated in Step S103 is equal to or less than the threshold value (Step S104: "Yes"), on the other hand, the processing proceeds to Step S106. The case in which the processing proceeds to Step S106 is the case in which the switch determination unit 122 determines that there is a fear of contact between the top surface 1314 of the base unit 1310 and the proximal end 13252 of the second wire guide 1325.

In Step S106, the switch determination unit 122 makes a switch in the second switch portion 125 in a direction reverse to the direction illustrated in FIG. 1 to perform control so that the drive displacement amount $l_{p1b}$ and drive displacement amount $l_{p1c}$ calculated in Step S102 are not output to the continuum robot 130 via the second switch portion 125. At the same time, the switch determination unit 122 makes a switch in the first switch portion 123 in a direction reverse to the direction illustrated in FIG. 1 to perform control so that the drive displacement amount $l_{p1b}$ and drive displacement amount $l_{p1c}$ calculated in Step S102 are not stored in the memory portion 124, and to perform control so that the drive displacement amount $l_{p1b}$ and the drive displacement amount $l_{p1c}$ that are stored in the memory portion 124 in advance as values at which there is no fear of the contact described above are output to the continuum robot 130 via the second switch portion 125.

When Step S105 is finished, or when Step S106 is finished, the processing proceeds to Step S107.

In Step S107, the control device 120 controls the drive of the wire 1302 and the wire 1303 based respectively on the drive displacement amount $l_{p1b}$ and the drive displacement amount $l_{p1c}$ (drive displacement amounts at which there is no fear of the contact described above), which are output from the second switch portion 125 in Step S105 or Step S106, to thereby control the drive of the continuum robot 130.

When Step S107 is finished, the processing returns to Step S101 to wait for the next input of the target curve angle $\theta_{ref1}$ and the target rotation angle $\zeta_{ref1}$ from the input device 110.

<Maximum Value of the Curve Angle $\theta_1$>

A case of calculating a maximum value of the curve angle $\theta_1$ with the use of a kinematic model provided by the kinematic model arithmetic portion 121 is described next.

In the calculation of a maximum value of the curve angle $\theta_1$, the range of the curve angle $\theta_1$ is determined by a contact between the distal end 13214 of the first wire guide 1321 and the top surface 1314 of the base unit 1310 and a contact between the proximal end 13252 of the second wire guide 1325 and the top surface 1314 of the base unit 1310. In the first embodiment, a restriction put on the curve angle $\theta_1$ by the former contact is set to 270 degrees, and a maximum value of the curve angle $\theta_1$ that is allowed by the latter contact is calculated. The curve angle $\theta_1$ in this case is varied from 0 degrees to 270 degrees at an increment of 1 degree at each rotation angle $\zeta_1$, which is varied, for example, from 0 degrees to 359 degrees at an increment of 1 degree.

Figure 6:
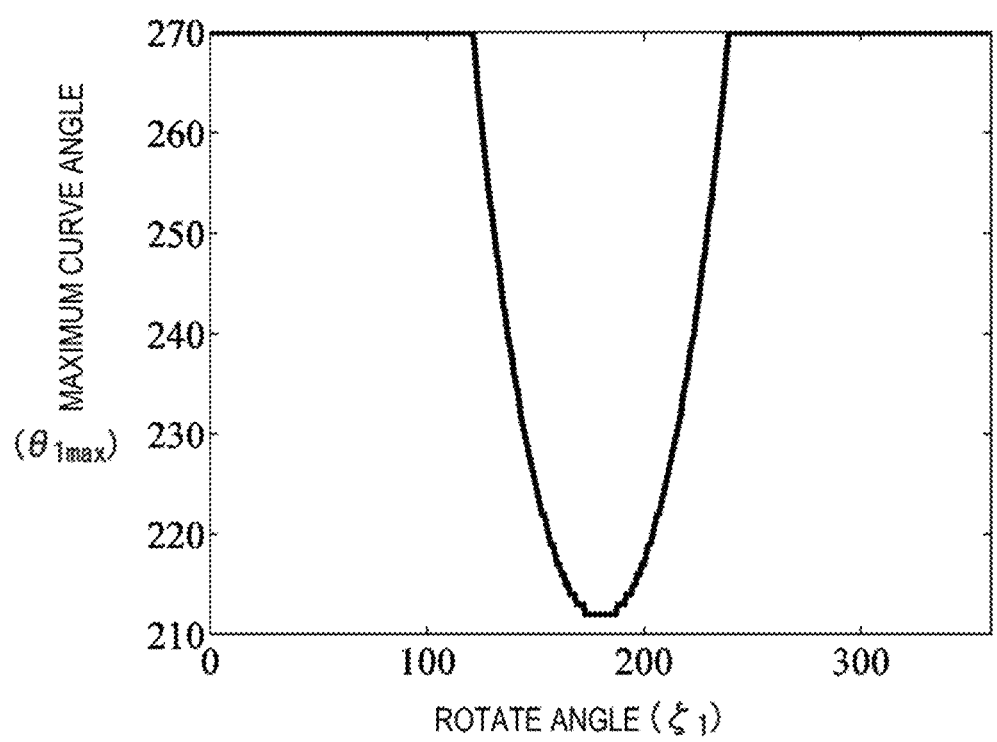
FIG. 6 is a graph for showing the result of simulating a relation between each rotation angle and a maximum curve angle in the first embodiment of this disclosure.

The result of a simulation is shown in FIG. 6 in which the coordinate value $z_{e1}(\theta_e)$ is calculated by Expression (20) given above and a maximum curve angle that makes the coordinate value $z_{e1}(\theta_e)$ equal to or more than a threshold value (here, 0) is given as $\theta_{1max}$. In other words, FIG. 6 is a graph for showing the result of a simulation about the relation of each rotation angle $\zeta_1$ to the maximum curve angle $\theta_{1max}$ in the first embodiment of this disclosure. It is understood from FIG. 6 that the maximum curve angle $\theta_{1max}$ has the smallest value when the rotation angle $\zeta_1$ is 180 degrees. This indicates that a curve angle at which the proximal end 13252 comes into contact with the top surface 1314 of the base unit 1310 is smallest at the rotation angle $\zeta_1$ that makes the rotation angle reverse to the direction of the wire 1301 viewed from the original O.

As described above, the switch determination unit 122 in the first embodiment performs control (drive control) with respect to whether to drive the wire 1302 and the wire 1303 by the drive displacement amount of the wire 1302 and the drive displacement amount of the wire 1303, which are calculated along with the coordinate value $z_{e1}(\theta_e)$ by the kinematic model arithmetic portion 121, based on the coordinate value $z_{e1}(\theta_e)$ calculated by the kinematic model arithmetic portion 121.

According to this configuration of the first embodiment, a contact between a member that serves as a reference surface for the curve shape of the curvable portion 1320 of the continuum robot 130 (the base unit 1310) and a member in the curvable portion that is closest to the reference surface (the second wire guide 1325) can be prevented when, for example, the curvable portion 1320 is driven along the insertion/extraction path 400 (more specifically, when, for example, the curvable portion 1320 is driven while avoiding a contact with the insertion/extraction path 400).

Second Embodiment

A second embodiment of this disclosure is described next. The following description of the second embodiment focuses on differences from the first embodiment, and a description on the same part as that of the second embodiment is omitted.

<Configuration Example of a Continuum Robot Control System>

Figure 7:
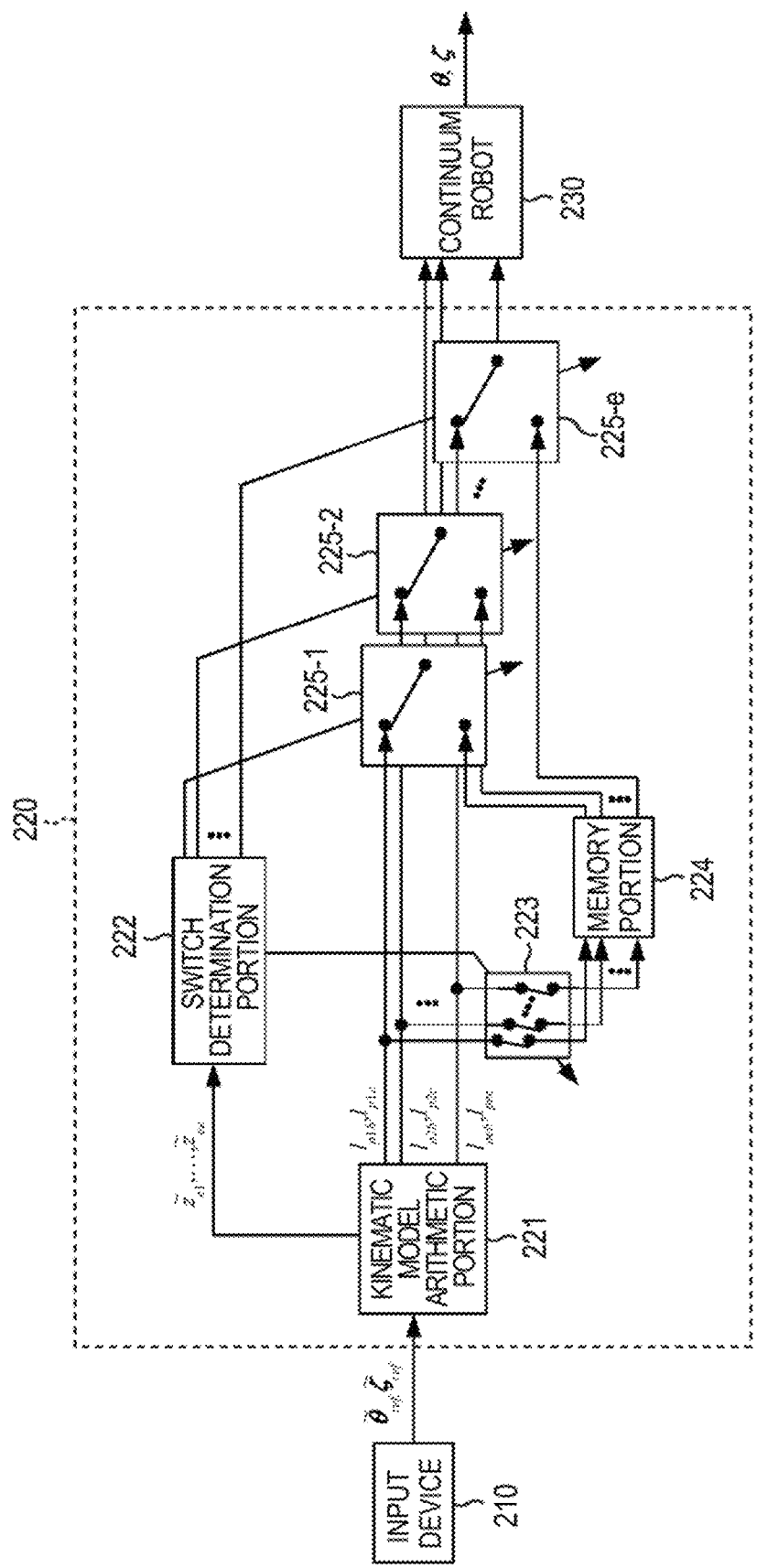
FIG. 7 is a schematic diagram for illustrating an example of the configuration of a continuum robot control system according to a second embodiment of this disclosure.

FIG. 7 is a schematic diagram for illustrating an example of the configuration of a continuum robot control system 200 according to a second embodiment of this disclosure. The continuum robot control system 200 includes, as illustrated in FIG. 7, an input device 210, a control device 220, and a continuum robot 230.

<<Configuration Example of the Continuum Robot>>

An example of the configuration of the continuum robot 230 illustrated in FIG. 7 is described first.

Figure 8:
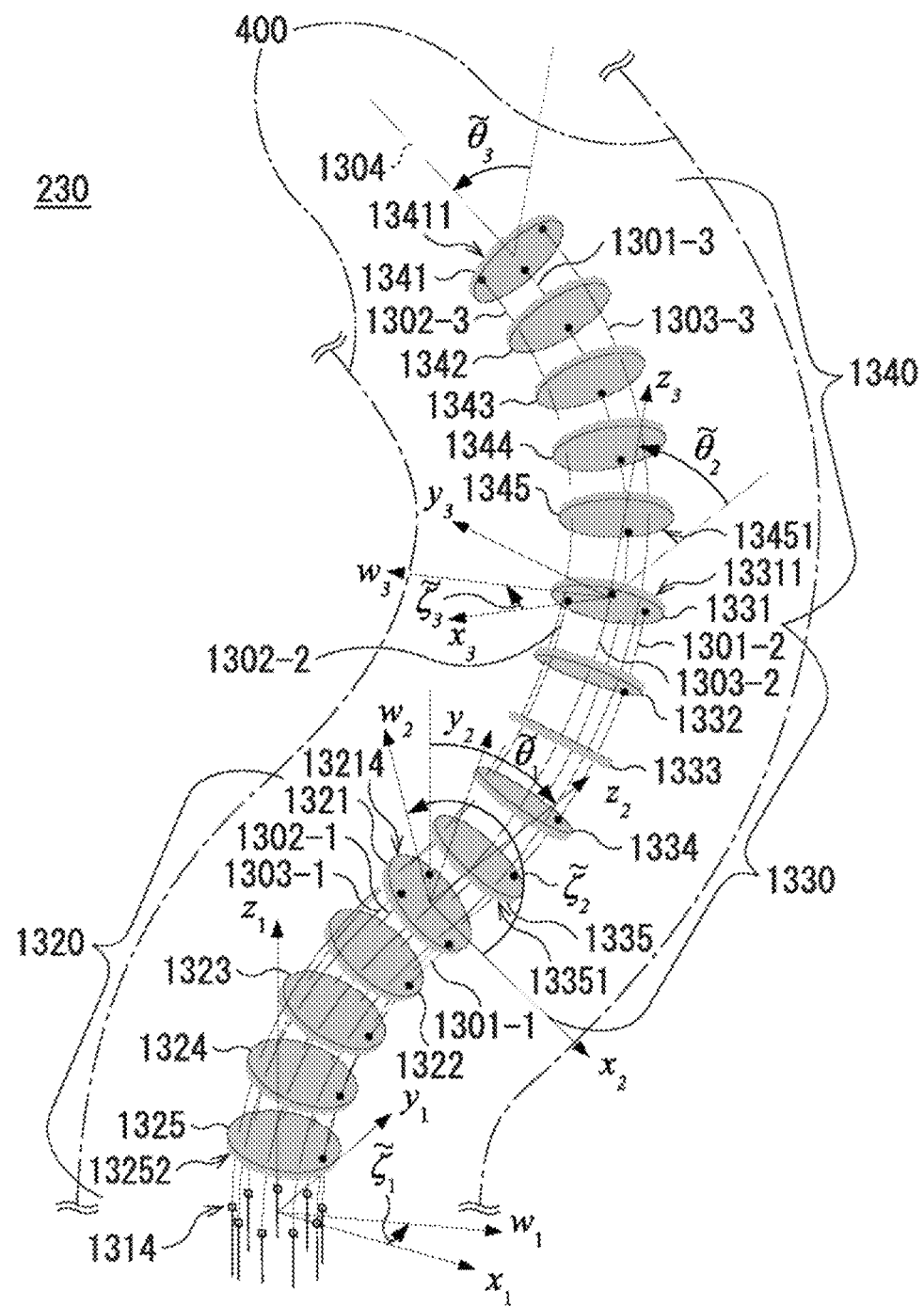
FIG. 8 is a schematic diagram for illustrating an example of the configuration of a continuum robot illustrated in FIG. 7.

FIG. 8 is a schematic diagram for illustrating an example of the configuration of the continuum robot 230 illustrated in FIG. 7. In FIG. 8, components having the same functions as those of the components illustrated in FIG. 2 are denoted by the same reference symbols, and detailed descriptions thereof are omitted. Only the top surface 1314 of the base unit 1310 illustrated in FIG. 2 is illustrated in FIG. 8, and the internal configuration of a part of the base unit 1310 that is located below the top surface 1314 is omitted from FIG. 8. The continuum robot 230 includes, as illustrated in FIG. 8, the base unit 1310 (only the top surface 1314 of the base unit 1310 is illustrated in FIG. 8), a first curvable portion 1320, a second curvable portion 1330, and a third curvable portion 1340. The component in FIG. 8 that corresponds to the curvable portion 1320 illustrated in FIG. 2 is referred to as "first curvable portion 1320".

The continuum robot 230 illustrated in FIG. 8 has the plurality of curvable portions 1320 to 1340 in series along its longitudinal axial direction, and is configured so as to be movable in a longitudinal axial direction of the plurality of curvable portions 1320 to 1340. While the continuum robot has three curvable portions in the example of FIG. 8, the second embodiment is not limited to this mode. The second embodiment is also applicable to, for example, a continuum robot having two curvable portions, and a continuum robot having four or more curvable portions.

The first curvable portion 1320 includes wire sections 1301-1, 1302-1, and 1303-1 of a plurality of wires, the first wire guide 1321, and the second wire guides 1322 to 1325. The wire sections 1301-1, 1302-1, and 1303-1 of a plurality of wires extend through the top surface 1314 of the base unit 1310, which serves as a reference surface of the first curvable portion 1320. The first wire guide 1321 guides the wire sections 1301-1, 1302-1, and 1303-1 of a plurality of wires by fixing the wire sections 1301-1, 1302-1, and 1303-1 of a plurality of wires at different points in the first wire guide 1321. The second wire guides 1322 to 1325 are provided between the top surface 1314 of the base unit 1310 and the first wire guide 1321 to guide the wire sections 1301-1, 1302-1, and 1303-1 of a plurality of wires by fixing a part of the wire sections 1301-1, 1302-1, and 1303-1 of a plurality of wires, here, the wire section 1301-1, at predetermined points in the second wire guides 1322 to 1325. In the first curvable portion 1320, an "$x_1$-axis", which corresponds to the x-axis illustrated in FIG. 2, a "$y_1$-axis", which corresponds to the y-axis illustrated in FIG. 2, a "$z_1$-axis", which corresponds to the z-axis illustrated in FIG. 2, and a "$w_1$-axis", which corresponds to the w-axis illustrated in FIG. 2, are defined by using as a reference the top surface 1314 of the base unit 1310, which serves as the reference surface of the first curvable portion 1320. The distal end 13214 of the first wire guide 1321 and the proximal end 13252 of the second wire guide 1325 are located in the first curvable portion 1320. The first curvable portion 1320 in this case begins from the top surface 1314 of the base unit 1310 (strictly speaking, the top surface 1314 itself is not included) and reaches the distal end 13214 of the first wire guide 1321. The rest of the configuration of the first curvable portion is the same as that of the curvable portion 1320 in the first embodiment described above.

The second curvable portion 1330 includes wire sections 1301-2, 1302-2, and 1303-2 of a plurality of wires, a first wire guide 1331, and second wire guides 1332 to 1335. The wire sections 1301-2, 1302-2, and 1303-2 of a plurality of wires extend through the distal end 13214 of the first wire guide 1321 of the first curvable portion 1320, which serves as a reference surface of the second curvable portion 1330. The first wire guide 1331 guides the wire sections 1301-2, 1302-2, and 1303-2 of a plurality of wires by fixing the wire sections 1301-2, 1302-2, and 1303-2 of a plurality of wires at different points in the first wire guide 1331. The second wire guides 1332 to 1335 are provided between the surface of the distal end 13214 of the first wire guide 1321 of the first curvable portion 1320 and the first wire guide 1321 to guide the wire sections 1301-2, 1302-2, and 1303-2 of a plurality of wires by fixing a part of the wire sections 1301-2, 1302-2, and 1303-2 of a plurality of wires, here, the wire section 1301-2, at predetermined points in the second wire guides 1332 to 1335. In the second curvable portion 1330, an "$x_2$-axis", which corresponds to the x-axis illustrated in FIG. 2, a "$y_2$-axis", which corresponds to the y-axis illustrated in FIG. 2, a "$z_2$-axis", which corresponds to the z-axis illustrated in FIG. 2, and "$w_2$-axis", which corresponds to the w-axis illustrated in FIG. 2, are defined by using as a reference the distal end 13214 of the first wire guide 1321 of the first curvable portion 1320, which serves as the reference surface of the second curvable portion 1330. The distal end 13311 of the first wire guide 1331 and a proximal end 13351 of the second wire guide 1335 are located in the second curvable portion 1330. The second curvable portion 1330 in this case begins from the surface of the distal end 13214 of the first wire guide 1321 of the first curvable portion 1320 (strictly speaking, the surface of the distal end 13214 is not included) and reaches a distal end 13311 of the first wire guide 1331. In the second embodiment, an actuator for push-pull drive of the wire section 1302-2 (an actuator corresponding to the actuator 1311 of FIG. 2), an actuator for push-pull drive of the wire section 1303-2 (an actuator corresponding to the actuator 1312 of FIG. 2), and a fixing portion for fixing one end of the wire section 1301-2 (a fixing portion corresponding to the fixing portion 1313 of FIG. 3), are provided inside the base unit 1310, in addition to the components in the first embodiment. In other words, the continuum robot 230 illustrated in FIG. 8 is configured so that the second curvable portion 1330 can be curved into a desired curve shape (for example, an arc shape) by controlling the actuators to drive the wire sections 1302-2 and 1303-2.

The third curvable portion 1340 includes wire sections 1301-3, 1302-3, and 1303-3 of a plurality of wires, a first wire guide 1341, and second wire guides 1342 to 1345. The wire sections 1301-3, 1302-3, and 1303-3 of a plurality of wires extend through the surface of the distal end 13311 of the first wire guide 1331 of the second curvable portion 1330, which serves as a reference surface of the third curvable portion 1340. The first wire guide 1341 guides the wire sections 1301-3, 1302-3, and 1303-3 of a plurality of wires by fixing the wire sections 1301-3, 1302-3, and 1303-3 of a plurality of wires at different points in the first wire guide 1341. The second wire guides 1342 to 1345 are provided between the surface of the distal end 13311 of the first wire guide 1331 of the second curvable portion 1330 and the first wire guide 1341 to guide the wire sections 1301-3, 1302-3, and 1303-3 of a plurality of wires by fixing a part of the wire sections 1301-3, 1302-3, and 1303-3 of a plurality of wires, here, the wire section 1301-3, at predetermined points in the second wire guides 1342 to 1345. In the third curvable portion 1340, an "$x_3$-axis", which corresponds to the x-axis illustrated in FIG. 2, a "$y_3$-axis", which corresponds to the y-axis illustrated in FIG. 2, a "$z_3$-axis", which corresponds to the z-axis illustrated in FIG. 2, and "$w_3$-axis", which corresponds to the w-axis illustrated in FIG. 2, are defined by using as a reference the surface of the distal end 13311 of the first wire guide 1331 of the second curvable portion 1330, which serves as the reference surface of the third curvable portion 1340. A distal end 13411 of the first wire guide 1341 and a proximal end 13451 of the second wire guide 1345 are located in the third curvable portion 1340. The third curvable portion 1340 in this case begins from the surface of the distal end 13311 of the first wire guide 1331 of the second curvable portion 1330 (strictly speaking, the surface of the distal end 13311 itself is not included) and reaches the distal end 13411 of the first wire guide 1341. In the second embodiment, an actuator for push-pull drive of the wire section 1302-3 (an actuator corresponding to the actuator 1311 of FIG. 2), an actuator for push-pull drive of the wire section 1303-3 (an actuator corresponding to the actuator 1312 of FIG. 2), and a fixing portion for fixing one end of the wire section 1301-3 (a fixing portion corresponding to the fixing portion 1313 of FIG. 2), are also provided inside the base unit 1310. In other words, the continuum robot 230 illustrated in FIG. 8 is configured so that the third curvable portion 1340 can be curved into a desired curve shape (for example, an arc shape) by controlling the actuators to drive the wire sections 1302-3 and 1303-3.

In the continuum robot 230 illustrated in FIG. 8, a camera (not shown) is provided at a point beyond the first wire guide 1341 on the far side from the top surface 1314. The interior of the insertion/extraction path 400 can thus be observed by inserting the curvable portions 1320 to 1340 along the insertion/extraction path 400.

The curvable portions 1320 to 1340 each have a different reference surface in the second embodiment. Accordingly, a symbol "~" indicating that a value belongs to a relative coordinate system, which is described later, is attached above the symbol letter of each of the curve angle $\theta_1$ of the curvable portion 1320, a curve angle $\theta_2$ of the curvable portion 1330, a curve angle $\theta_3$ of the curvable portion 1340, the rotation angle $\zeta_1$ of the curvable portion 1320, a rotation angle $\zeta_2$ of the curvable portion 1330, and a rotation angle $\zeta_3$ of the curvable portion 1340 in FIG. 8.

The description refers back to FIG. 7. The example of FIG. 7 is a case in which e curvable portions are provided in the continuum robot 230. When the continuum robot 230 to be controlled is the one illustrated in FIG. 8, the value of e is "3".

The input device 210 inputs, to the control device 120, for each of e curvable portions, a target curve angle $\theta_{ref}$ and a target rotation angle $\zeta_{ref}$, which are curve-shape parameters of the curvable portion. The target curve angle $\theta_{ref}$ is a target value of the curve angle $\theta$ of the curvable portion. The target rotation angle $\zeta_{ref}$ is a target value of the rotation angle $\zeta$ of the curvable portion. The input target curve angle $\theta_{ref}$ and target rotation angle $\zeta_{ref}$ belong to a relative coordinate system described later. The symbol "~" indicating that a value belongs to a relative coordinate system is accordingly attached above the symbol letter of each of the target curve angle $\theta_{ref}$ and the target rotation angle $\zeta_{ref}$. Further, the input device 210 is configured so that the curve-shape parameters, which include the target curve angle $\theta_{ref}$ and the target rotation angle $\zeta_{ref}$, can be input sequentially in time series (e.g., for every predetermined discrete-time step). The curve-shape parameters input sequentially in time series by the input device 210 may include the target curve angle $\theta_{ref}$ and target rotation angle $\zeta_{ref}$ of different values.

The control device 220 controls drive of the continuum robot 230 based on the curve-shape parameters of each curvable portion input from the input device 210. The control device 220 includes, as illustrated in FIG. 7, a kinematic model arithmetic portion 221, a switch determination unit 222, a first switch portion 223, a memory portion 224, and second switch portions 225-1 to 225-e. Specifically, the control device 220 derives a model based on kinematics for each curvable portion of the continuum robot 230 whose shape can be controlled three-dimensionally by driving two wires 1302 and 1303 out of the three wires 1301 to 1303. The control device 220 performs control for each curvable portion to avoid a contact between the reference surface of the curvable portion and the proximal end of a second wire guide that is closest to this reference surface.

The kinematic model arithmetic portion 221 calculates, from the target curve angles $\theta_{ref}$ and target rotation angles $\zeta_{ref}$ of the respective curvable portions input from the input device 210, drive displacement amounts $l_{p1b}, l_{p2b} \ldots l_{peb}$ of the sections of the wire 1302 and drive displacement amounts $l_{p1c}, l_{p2c} \ldots l_{pec}$ of the sections of the wire 1303. The kinematic model arithmetic portion 221 also calculates coordinate values $z_{e1}(\theta_e) \ldots z_{ee}(\theta_e)$ from the target curve angles $\theta_{ref}$ and target rotation angles $\zeta_{ref}$ of the respective curvable portions input from the input device 210. The coordinate values $z_{e1}(\theta_e) \ldots z_{ee}(\theta_e)$ are each a piece of distance information indicating the distance between a reference surface and the proximal end of a second wire guide that is closest to the reference surface. The coordinate values $z_{e1}(\theta_e) \ldots z_{ee}(\theta_e)$ calculated here belong to a relative coordinate system described later. The symbol "~" indicating that a value belongs to a relative coordinate system is accordingly attached above "z" in the coordinate values $z_{e1}(\theta_e) \ldots z_{ee}(\theta_e)$. The kinematic model arithmetic portion 221 configured to calculate the drive displacement amounts $l_{p1b}, l_{p2b} \ldots l_{peb}$, the drive displacement amounts $l_{p1c}, l_{p2c} \ldots l_{pec}$, and the coordinate values $z_{e1}(\theta_e) \ldots z_{ee}(\theta_e)$ is an example of a component corresponding to the "calculation unit" of this disclosure.

The switch determination unit 222 performs control (drive control), for each curvable portion, with respect to whether to drive the relevant section of the wire 1302 and the relevant section of the wire 1303 by the relevant drive displacement amount of the section of the wire 1302 and the relevant drive displacement amount of the section of the wire 1303 out of the drive displacement amounts $l_{p1b}, l_{p2b} \ldots l_{peb}$ and the drive displacement amounts $l_{p1c}, l_{p2c} \ldots l_{pec}$, which are calculated along with the coordinate values $z_{e1}(\theta_e) \ldots z_{ee}(\theta_e)$ by the kinematic model arithmetic portion 221, based on the relevant one of the coordinate values $z_{e1}(\theta_e) \ldots z_{ee}(\theta_e)$ calculated by the kinematic model arithmetic portion 221. Specifically, the switch determination unit 222 determines, for each curvable portion, whether or not the relevant one of the coordinate values $z_{e1}(\theta_e) \ldots z_{ee}(\theta_e)$ is equal to or less than a threshold value, and performs the drive control described above based on the determination. When the threshold value is set to 0, for example, and the coordinate value of one of the curvable portions is equal to or less than the threshold value 0, a contact is expected to occur between the reference surface of the curvable portion and the proximal end of a second wire guide that is closest to this reference surface. As a way to determine whether a reference surface and the proximal end of a second wire guide that is closest to the reference surface is a possibility, it is preferred to set the threshold value to 0. However, this disclosure is not limited to this mode, and may also employ a mode in which a predetermined positive value is set as the threshold value by taking into consideration the safety rate related to the contact.

When one of the coordinate values $z_{e1}(\theta_e) \ldots z_{ee}(\theta_e)$ calculated for the respective curvable portions is not equal to or less than the threshold value, the switch determination unit 222 determines that there is no fear of contact between the reference surface of the relevant curvable portion and the proximal end of a second wire guide that is closest to this reference surface. The switch determination unit 222 in this case makes switches in the first switch portion 223 associated with this curvable portion and one of the second switch portions 225 (225-1 to 225-e) that is associated with this curvable portion in the manner illustrated in FIG. 7. Specifically, the switch determination unit 222 makes a switch in one of the second switch portions 225 that is associated with this curvable portion in the manner illustrated in FIG. 7 to perform control so that drive displace amounts calculated for the relevant section of the wire 1302 and the relevant section of the wire 1303 along with the one of the coordinate values by the kinematic model arithmetic portion 221 are output to the continuum robot 230. This causes the continuum robot 230 to drive the section of the wire 1302 and the section of the wire 1303 by the drive displacement amount of the section of the wire 1302 and the drive displacement amount of the section of the wire 1303, which are calculated along with the one of the coordinate values by the kinematic model arithmetic portion 221. The switch determination unit 222 in this case also makes a switch in the first switch portion 223 associated with this curvable portion in the manner illustrated in FIG. 7 to perform control so that the drive displacement amounts calculated for the section of the wire 1302 and the section of the wire 1303 along with the one of the coordinate values by the kinematic model arithmetic portion 221 are stored in the memory portion 224. The memory portion 224 thus stores, when one of the coordinate values described above is not equal to or less than the threshold value (i.e., when it is determined that there is no fear of contact), drive displacement amounts calculated for a section of the wire 1302 and a section of the wire 1303 by the kinematic model arithmetic portion 221 along with the coordinate value.

When one of the coordinate values $z_{e1}(\theta_e) \ldots z_{ee}(\theta_e)$ calculated for the respective curvable portions is equal to or less than the threshold value, on the other hand, the switch determination unit 222 determines that there is a fear of contact between the reference surface of the relevant curvable portion and the proximal end of a second wire guide that is closest to this reference surface. The switch determination unit 222 in this case makes switches in the first switch portion 223 associated with this curvable portion and one of the second switch portions 225 (225-1 to 225-e) that is associated with this curvable portion in a direction reverse to the direction illustrated in FIG. 7. In other words, the switch determination unit 225 in this case performs control so that the relevant section of the wire 1302 and the relevant section of the wire 1303 are not driven by the drive displacement amount of the section of the wire 1302 and the drive displacement amount of the section of the wire 1303, which are calculated along with the one of the coordinate values by the kinematic model arithmetic portion 221. Specifically, the switch determination unit 225 first makes a switch in the first switch portion 223 associated with this curvable portion in a direction reverse to the direction illustrated in FIG. 7 to perform control so that the drive displacement amounts calculated for the section of the wire 1302 and the section of the wire 1303 by the kinematic model arithmetic portion 221 along with the one of the coordinate values are not stored in the memory portion 224. This ensures that the memory portion 224 stores drive displacement amounts calculated for a section of the wire 1302 and a section of the wire 1303 by the kinematic model arithmetic portion 221 along with the coordinate value of one of the curvable portions only when the coordinate value is not equal to or less than the threshold value (i.e., only when it is determined that there is no fear of contact). The switch determination unit 222 then makes a switch in the second switch portion 225 associated with each curvable portion in a direction reverse to the direction illustrated in FIG. 7 to perform control so that the drive displacement amounts for a section of the wire 1302 and a section of the wire 1303, which are calculated along with the coordinate value by the kinematic model arithmetic portion 221, are not output to the continuum robot 230. This prevents the wire 1302 and the wire 1303 in the continuum robot 230 from being driven respectively by the drive displacement amounts for a section of the wire 1302 and a section of the wire 1303, which are calculated along with the coordinate value by the kinematic model arithmetic portion 221, with the result that the contact described above is avoided. To give a more detailed description, the switch determination unit 222 in this case makes a switch in the second switch portion 225 associated with each curvable portion in a direction reverse to the direction illustrated in FIG. 7 to perform control so that the drive displacement amounts for a section of the wire 1302 and a section of the wire 1303 that are stored in the memory portion 224 in advance as values calculated along with the coordinate value by the kinematic model arithmetic portion 221 at a previous time when the coordinate value calculated for the curvable portion by the kinematic model arithmetic portion 221 is not equal to or less than the threshold value (i.e., when it is determined that there is no fear of contact) are output to the continuum robot 230. This causes the continuum robot 230 to drive each curvable portion while avoiding the contact described above.

The memory portion 224 in the second embodiment stores the predetermined drive displacement amount for each curvable portion calculated by the kinematic model arithmetic portion 221. However, this disclosure is not limited to this mode and may also employ, for example, a mode in which, for each curvable portion, the drive displacement amounts for a section of the wire 1302 and a section of the wire 1303 that are verified to be effective in avoiding the contact described above are stored in advance instead of drive displacement amounts calculated by the kinematic model arithmetic portion 221. The switch determination unit 222 is an example of a component corresponding to the "determination unit" of this disclosure.

The kinematic model arithmetic portion 221, the switch determination unit 222, the first switch portion 223, the memory portion 224, and the second switch portions 225-1 to 225-*e* of the control device 220 illustrated in FIG. 7 may be hardware components or software components. When the constituent portions 221 to 225 of the control device 220 illustrated in FIG. 7 are software components, functions of the constituent portions 221 to 225 are implemented by, for example, a CPU of a computer by executing a program stored in a ROM or other storage media.

A specific processing example of the control device 220 is described next.

The following description deals with a case in which the continuum robot 230 illustrated in FIG. 8 is provided with n curvable portions.

A relative coordinate system of the n-th curvable portion in this case has, as a reference surface, a surface of the distal end of the first wire guide in the (n−1)-th curvable portion. A $z_n$-axis is set on a line extended from the central axis 1304 of the surface of the distal end of the first wire guide in the (n−1)-th curvable portion, and an $x_n$-axis is set in a direction orthogonal to the $z_n$-axis on a $z_{n-1}$-$w_{n-1}$ plane. A $y_n$-axis is set as a right-hand system coordinate axis orthogonal to the $z_n$-axis and the $x_n$-axis.

In the second embodiment, a relation between the curve angle of the n-th curvable portion and the coordinates of the distal end of the first wire guide in the n-th curvable portion is derived first, with n set to a value equal to or more than 2. The length ($l_{nd}$) of the central axis of the n-th curvable portion varies depending on the curve shape of the n-th curvable portion as described in the first embodiment. In each of the plurality of curvable portions, a wire length up through the curvable portion that is not changed by a change in shape is the total length of sections of the wire 1301, which is a fixed wire in the respective curvable portions, from the distal end of the first wire guide of the curvable portion to the base unit 1310. In order to obtain the length of a section of the wire 1301 that is in the n-th curvable portion, it is therefore required to obtain the length of sections of the wire 1301 running through all curvable portions that are closer to the base unit 1310 than the n-th curvable portion is.

The length of a section of the wire 1301 that is in the n-th curvable portion out of a section of the wire 1301 that is connected to the distal end of the first wire guide of an m-th curvable portion is given here as $l_{man}$. The central axis of each curvable portion has a length l when the continuum robot is in an erect posture in which every curve angle and every rotation angle are set to 0. This gives sections of the wire 1301, which is a fixed wire in the n-th curvable portion, a total length of nl.

The length of a wire section in the first curvable portion out of the length of wire sections up through the m-th curvable portion is obtained first. When a wire section in the m-th curvable portion is arranged so that a phase angle $\xi_m$ replaces the phase angle $\xi_n$ illustrated in FIG. 3, a relative phase angle of the m-th curvable portion relative to the first curvable portion is defined by Expression (24) as follows:

$$\zeta_{1m} = \zeta_m - \zeta_1 \quad (24)$$

where $\zeta_m$ represents the relative phase angle of the m-th curvable portion relative to the first curvable portion.

Accordingly, a length $l_{ma1}$ of a section of the wire 1301 that is in the first curvable portion out of a section of the wire 1301 that is connected to the distal end of the first wire guide of the m-th curvable portion is expressed by Expression (25), and a length $l_{mb1}$ of the corresponding section of the wire 1302 and a length $l_{mc1}$ of the corresponding section of the wire 1303 are expressed by Expression (26) and Expression (27), respectively.

$$l_{ma1} = l_{1a} + \frac{r_s}{\sqrt{3}}(\cos\zeta_1 - \cos\zeta_{1m})\theta_1 \quad (25)$$

$$l_{mb1} = l_{1a} + \frac{r_s}{\sqrt{3}}\left\{\cos\zeta_1 - \cos\left(\frac{2\pi}{3} + \zeta_{1m}\right)\right\}\theta_1 \quad (26)$$

$$l_{mc1} = l_{1a} + \frac{r_s}{\sqrt{3}}\left\{\cos\zeta_1 - \cos\left(\frac{1\pi}{3} + \zeta_{1m}\right)\right\}\theta_1 \quad (27)$$

A length $l_{2a}$ of a section of the wire 1301 that is in the second curvable portion can be calculated by subtracting, from the total length (2l) of sections of the wire 1301 up through the second curvable portion, the length ($l_{2a1}$) of a section of the wire 1301 that runs in the first curvable portion out of the sections of the wire 1301 up through the second curvable portion, to thereby be obtained by Expression (28).

$$l_{2a} = 2l - l_{2a1} \tag{28}$$

An angle $v_2$, which is obtained by subtracting a phase angle $\xi_2$ from the sum of rotation angles about the central axis up through the second curvable portion, is defined by Expression (29).

$$v_2 = \sum_{k=1}^{2} \zeta_k - \xi_2 \tag{29}$$

Then a length $l_{2d}$ of the central axis in the second curvable portion is expressed by Expression (30), and a length $l_{2b}$ of the corresponding section of the wire 1302 and a length $l_{2c}$ of the corresponding section of the wire 1303 are expressed by Expression (31) and Expression (32), respectively.

$$l_{2d} = l_{2a} + \frac{r_s}{\sqrt{3}} \cos v_2 \tilde{\theta}_2 \tag{30}$$

$$l_{2b} = l_{2a} + r_s \cos\left(\frac{\pi}{6} + v_2\right) \tilde{\theta}_2 \tag{31}$$

$$l_{2c} = l_{2a} + r_s \cos\left(\frac{\pi}{6} - v_2\right) \tilde{\theta}_2 \tag{32}$$

The length $l_{2d}$ of the central axis in the second curvable portion can be obtained with the use of the length $l_{2a1}$ of a section of the wire 1301, which is shown in Expression (28), in this manner. The length of a wire section that runs in the second portion out of wire sections up through the m-th curvable portion is further obtained in order to obtain the length of the central axis of a curvable portion subsequent to the second curvable portion. A relative phase angle of the m-th curvable portion relative to the second curvable portion is defined by Expression (33) as follows:

$$\hat{\zeta}_{2m} = \xi_m - \sum_{k=1}^{2} \zeta_k \tag{33}$$

where $\hat{\zeta}_{2m}$ represents the relative phase angle of the m-th curvable portion relative to the second curvable portion.

Accordingly, a length $l_{ma2}$ of a section of the wire 1301 that is in the second curvable portion out of a section of the wire 1301 that is connected to the distal end of the first wire guide of the m-th curvable portion is expressed by Expression (34), and a length $l_{mb2}$ of the corresponding section of the wire 1302 and a length $l_{mc2}$ of the corresponding section of the wire 1303 are expressed by Expression (35) and Expression (36), respectively.

$$l_{ma2} = l_{2a} + \frac{r_s}{\sqrt{3}} \left(\cos v_2 - \cos \hat{\zeta}_{2m}\right) \tilde{\theta}_2 \tag{34}$$

$$l_{mb2} = l_{2a} + \frac{r_s}{\sqrt{3}} \left\{\cos v_2 - \cos\left(\frac{2\pi}{3} + \hat{\zeta}_{2m}\right)\right\} \tilde{\theta}_2 \tag{35}$$

$$l_{mc2} = l_{2a} + \frac{r_s}{\sqrt{3}} \left\{\cos v_2 - \cos\left(\frac{4\pi}{3} + \hat{\zeta}_{2m}\right)\right\} \tilde{\theta}_2 \tag{36}$$

In this manner, the lengths of the central axes of the respective curvable portions can be obtained in order starting from the curvable portion closest to the base unit 1310.

The calculation is generalized to obtain a length $l_{na}$ of a section of the wire 1301 that is in the n-th curvable portion by Expression (37).

$$l_{na} = nl - (l_{na1} + l_{na2} + \cdots + l_{na(n-1)}) = nl - \sum_{k=1}^{n-1} l_{nak} \tag{37}$$

An angle $v_n$, which is a generalized form of the angle expressed by Expression (29), is defined by Expression (38).

$$v_n = \sum_{k=1}^{n} \zeta_k - \xi_n \tag{38}$$

Then the length $l_{nd}$ of the central axis in the n-th curvable portion is expressed by Expression (39), and a length $l_{nb}$ of the corresponding section of the wire 1302 and a length $l_{nc}$ of the corresponding section of the wire 1303 are expressed by Expression (40) and Expression (41), respectively.

$$l_{nd} = l_{na} + \frac{r_s}{\sqrt{3}} \cos v_n \tilde{\theta}_n \tag{39}$$

$$l_{nb} = l_{na} + r_s \cos\left(\frac{\pi}{6} + v_n\right) \tilde{\theta}_n \tag{40}$$

$$l_{nc} = l_{na} + r_s \cos\left(\frac{\pi}{6} - v_n\right) \tilde{\theta}_n \tag{41}$$

Expression (33) is generalized into Expression (42).

$$\hat{\zeta}_{nm} = \xi_m - \sum_{k=1}^{n} \zeta_k \tag{42}$$

Accordingly, the length $l_{man}$ of a section of the wire 1301 that is in the n-th curvable portion out of sections of the wire 1301 up through the m-th curvable portion is expressed by Expression (43), and a length $l_{mbn}$ of the corresponding section of the wire 1302 and a length $l_{mcn}$ of the corresponding section of the wire 1303 are expressed by Expression (44) and Expression (45), respectively.

$$l_{man} = l_{na} + \frac{r_s}{\sqrt{3}} \left(\cos v_n - \cos \hat{\zeta}_{nm}\right) \tilde{\theta}_n \tag{43}$$

$$l_{mbn} = l_{na} + \frac{r_s}{\sqrt{3}} \left\{\cos v_n - \cos\left(\frac{2\pi}{3} + \hat{\zeta}_{nm}\right)\right\} \tilde{\theta}_n \tag{44}$$

$$l_{mcn} = l_{na} + \frac{r_s}{\sqrt{3}} \left\{\cos v_n - \cos\left(\frac{4\pi}{3} + \hat{\zeta}_{nm}\right)\right\} \tilde{\theta}_n \tag{45}$$

When the length $l_{nd}$ of the central axis of the n-th curvable portion obtained through the steps described above is used, the coordinates of the distal end of the first wire guide of the n-th curvable portion in a relative coordinate system ($x_n$, $y_n$, $z_n$) are expressed by Expression (46) to Expression (48).

$$\tilde{x}_m = \frac{l_{nd}}{\tilde{\theta}_n} (1 - \cos \tilde{\theta}_n) \cos(\zeta_n + \xi_n) \tag{46}$$

$$\tilde{y}_m = \frac{l_{nd}}{\tilde{\theta}_n} (1 - \cos \tilde{\theta}_n) \sin(\zeta_n + \xi_n) \tag{47}$$

$$\tilde{z}_m = \frac{l_{nd}}{\tilde{\theta}_n} \sin \tilde{\theta}_n \tag{48}$$

where ($\tilde{x}_{tn}$, $\tilde{y}_{tn}$, $\tilde{z}_{tn}$) represent the coordinates of the distal end of the n-th curvable portion in the relative coordinate system ($x_n$, $y_n$, $z_n$).

Coordinates ($x_m$, $y_m$, $z_m$) of the distal end of the first wire guide of the n-th curvable portion in an absolute coordinate system are accordingly expressed by Expression (49) with the use of a rotational transform matrix.

$$\begin{bmatrix} x_{tn} \\ y_{tn} \\ z_{tn} \end{bmatrix} = \begin{bmatrix} x_{t1} \\ y_{t1} \\ z_{t1} \end{bmatrix} + \sum_{m=2}^{n} \prod_{k=1}^{m-1} R_z(\zeta_k + \xi_k) R_y(\tilde{\theta}_k) \begin{bmatrix} \tilde{x}_{tm} \\ \tilde{y}_{tm} \\ \tilde{z}_{tm} \end{bmatrix} \quad (49)$$

Coordinates in a relative coordinate system that are given below are obtained as outer circumferential coordinates of the proximal end of a second wire guide at a length $l_{awn}$ from the distal end of the first wire guide of the n-th curvable portion. The central coordinates of this second wire guide are given below.

Coordinates ($\tilde{x}_{en}$, $\tilde{y}_{en}$, $\tilde{z}_{en}$) in a relative coordinate system are obtained.

The central coordinates of the wire guide are given as ($\tilde{x}_{en0}$, $\tilde{y}_{en0}$, $\tilde{z}_{en0}$).

Expression (50) is then defined.

$$l_{wn} = l_{na} - l_{awn}, \tilde{\theta}_{wn} = \frac{l_{wn}}{l_{na}} \tilde{\theta}_n \quad (50)$$

The central coordinates of the second wire guide described above are in this case expressed by Expression (51) to Expression (53).

$$\tilde{x}_{en0} = \left\{ \frac{l_{wn}}{\tilde{\theta}_{wn}} (1 - \cos\tilde{\theta}_{wn}) - \frac{r_s}{\sqrt{3}} \cos\zeta_n \cos\tilde{\theta}_{wn} \right\} \cos\zeta_n \quad (51)$$

$$\tilde{y}_{en0} = \left\{ \left( \frac{l_{wn}}{\tilde{\theta}_{wn}} + \frac{r_s}{\sqrt{3}} \cos\zeta_n \right) \sin\tilde{\theta}_{wn} \right\} \sin\zeta_n \quad (52)$$

$$\tilde{z}_{en0} = \left\{ \left( \frac{l_{wn}}{\tilde{\theta}_{wn}} + \frac{r_s}{\sqrt{3}} \cos\zeta_n \right) \sin\tilde{\theta}_{wn} \right\} \quad (53)$$

The outer circumferential coordinates in the relative coordinate system of the proximal end of the second wire guide at the length $l_{awn}$ from the distal end of the first wire guide of the n-th curvable portion are accordingly expressed by Expression (54).

$$\begin{bmatrix} \tilde{x}_{en}(\theta_e) \\ \tilde{y}_{en}(\theta_e) \\ \tilde{z}_{en}(\theta_e) \end{bmatrix} = \begin{bmatrix} \tilde{x}_{en0} \\ \tilde{y}_{en0} \\ \tilde{z}_{en0} \end{bmatrix} + R_z(\zeta_n) R_y(\tilde{\theta}_n) \begin{bmatrix} r_{wy}\cos\theta_e \\ r_{wy}\sin\theta_e \\ 0 \end{bmatrix} \quad (54)$$

Relations of a drive displacement amount $l_{pnb}$ of a section of the wire 1302 that is in the n-th curvable portion and a drive displacement amount $l_{pnc}$ of a section of the wire 1303 that is in the n-th curvable portion to a curve angle $\theta_n$ and rotation angle $\zeta_n$ of the n-th curvable portion are derived next, with n set to a value equal to or more than 2. The drive displacement amounts of the section of the wire 1302 and the section of the wire 1303 in the relative coordinate system ($x_n$, $y_n$, $z_n$) have relations expressed by Expression (55) and Expression (56) with the curve angle of the first curvable portion.

The relation between a wire drive displacement amount $\tilde{l}_{pn}$ and an angle $\tilde{\theta}_n$ of the distal end of the first curvable portion in the relative coordinate system ($x_n$, $y_n$, $z_n$) is as follows:

$$\tilde{l}_{pnb} = r_s \cos\left(\frac{\pi}{6} + \zeta_n - \xi_n\right) \tilde{\theta}_n \quad (55)$$

$$\tilde{l}_{pnc} = r_s \cos\left(\frac{\pi}{6} - \zeta_n + \xi_n\right) \tilde{\theta}_n \quad (56)$$

The drive displacement amount $l_{pnb}$ of a section of the wire 1302 that is in the n-th curvable portion and the drive displacement amount $l_{pnc}$ of a section of the wire 1303 that is in the n-th curvable portion are each the sum of drive displacement amounts of wire sections from the first curvable portion to the n-th curvable portion in a relative coordinate system, and are expressed by Expression (57).

$$l_{pnb} = \sum_{m=1}^{n} \tilde{l}_{pmb}, \quad l_{pnc} = \sum_{m=1}^{n} \tilde{l}_{pmc} \quad (57)$$

Curve-shape parameters input from the input device 210, which is illustrated in FIG. 7, are expressed here by Expression (58).

Curve-shape parameters $\tilde{\theta}_{ref}$ and $\tilde{\zeta}_{ref}$ are expressed by the following expressions:

$$\tilde{\theta}_{ref} = [\tilde{\theta}_1 \tilde{\theta}_2 \ldots \tilde{\theta}_e]^T, \tilde{\zeta}_{ref} = [\tilde{\zeta}_1 \tilde{\zeta}_2 \ldots \tilde{\zeta}_e]^T \quad (58)$$

When the curve-shape parameters expressed by Expression (58) are input from the input device 210, the kinematic model arithmetic portion 221 calculates, for each curvable portion, a coordinate value given below as distance information, which indicates the distance between a reference surface and the proximal end of a second wire guide that is closest to the reference surface.

Coordinate values of proximal ends of wire guides:

$$\tilde{z}_{e1}, \ldots, \tilde{z}_{ee}$$

The switch determination unit 222 then determines, for each curvable portion, whether or not the calculated coordinate value is equal to or less than a threshold value, and controls the drive of the continuum robot 230 based on the determination. The specifics on the control of the drive of the continuum robot 230 are as described above with reference to FIG. 7.

<Maximum Value of the Curve Angle>

A case in which a maximum value is calculated for the curve angle $\theta_3$ of the third curvable portion 1340 illustrated in FIG. 8 is described next with the use of a kinematic model provided by the kinematic model arithmetic portion 221.

Here, the length l of each of the central axes 1304 of the curvable portions 1320 to 1340 in an erect posture is set to 0.010 m. The lengths $l_{aw1}$ to $L_{aw3}$ of the curvable portions 1320 to 1340 in an erect posture are each 0.0092 m. A restriction put on the curve angle at the distal end of the first wire guide is set to 270 degrees as in the first embodiment, and a maximum value of the curve angle $\theta_3$ that can be taken before the proximal end of the second wire guide closest to the reference surface comes into contact is calculated in the second embodiment. The maximum value of the curve angle $\theta_3$ of the third curvable portion 1340 varies depending on the angles of the first curvable portion 1320 and the second curvable portion 1330, which are closer to the base unit 1310 than the third curvable portion 1340 is. To accommodate this, simulation is conducted using four parameter patterns, a), b), c), and d), for curve shape parameters of the first curvable portion 1320 and the second curvable portion 1330:

$[\tilde{\theta}_1 \tilde{\theta}_2] = [0\ 0], [\tilde{\zeta}_1 \tilde{\zeta}_2] = [0\ 0]$   a)

$[\tilde{\theta}_1 \tilde{\theta}_2] = [0\ 60], [\tilde{\zeta}_1 \tilde{\zeta}_2] = [0\ 30]$   b)

$[\tilde{\theta}_1 \tilde{\theta}_2] = [60\ 60], [\tilde{\zeta}_1 \tilde{\zeta}_2] = [180\ 30]$   c)

$[\tilde{\theta}_1 \tilde{\theta}_2] = [20\ 60], [\tilde{\zeta}_1 \tilde{\zeta}_2] = [0\ 30]$   d)

In the calculation, the rotation angle $\zeta_3$ is varied from 0 degrees to 359 degrees at an increment of 1 degree, and the curve angle $\theta_3$ is varied from 0 degrees to 270 degrees at an increment of 1 degree at each rotation angle $\zeta_3$ as in the first embodiment.

A coordinate value $z_{e3}(\theta_e)$ is calculated by Expression (20) given above, and a maximum curve angle that makes the coordinate value $z_{e3}(\theta_e)$ equal to or more than a threshold value (here, 0) is given as $\theta_{3max}$. Curve shapes of the continuum robot 230 based on the curve parameters of the patterns a), b), c), and d) in which the third curvable portion 1340 is not curved are illustrated in FIG. 9A, FIG. 9B, FIG. 9C, and FIG. 9D, respectively. Simulation responses corresponding to the curve-shape parameters of the patterns a), b), c), and d) are shown in FIG. 10 in the forms of a solid line, a broken line, a dot-dash line, and a dotted line, respectively.

Figure 9A:
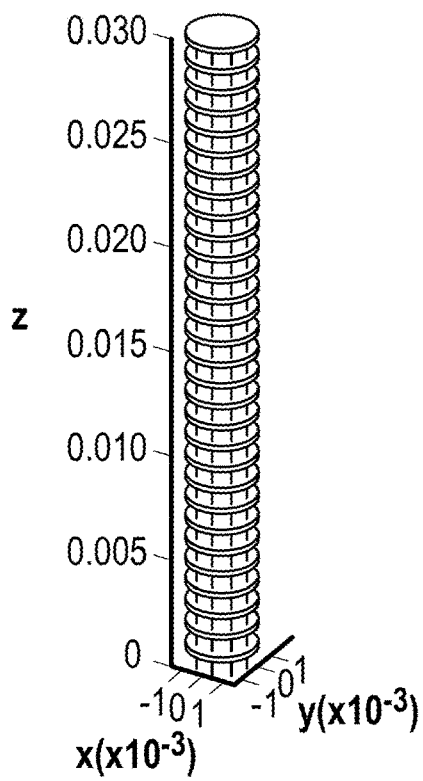
FIG. 9A is a diagram for illustrating an example of the curve shape of the continuum robot illustrated in FIG. 7.
Figure 9B:
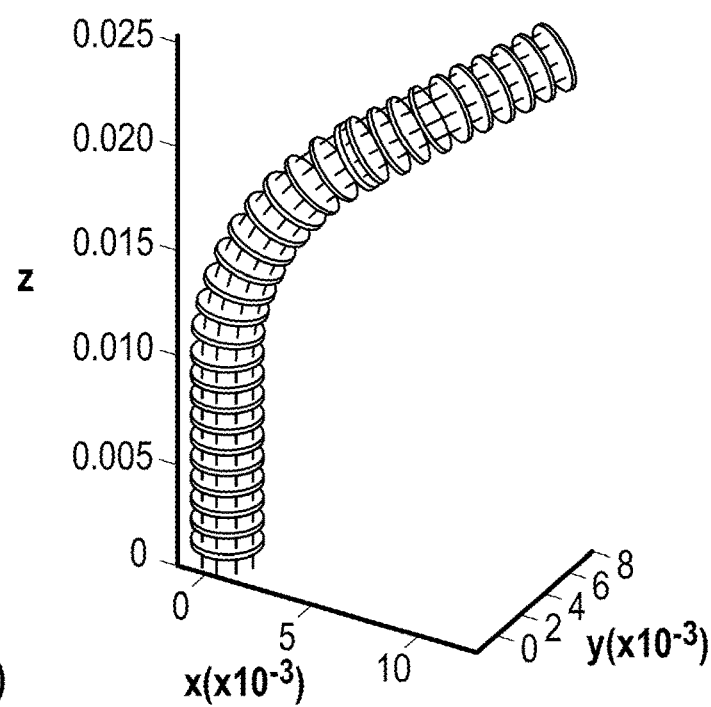
FIG. 9B is a diagram for illustrating another example of the curve shape of the continuum robot illustrated in FIG. 7.
Figure 9C:
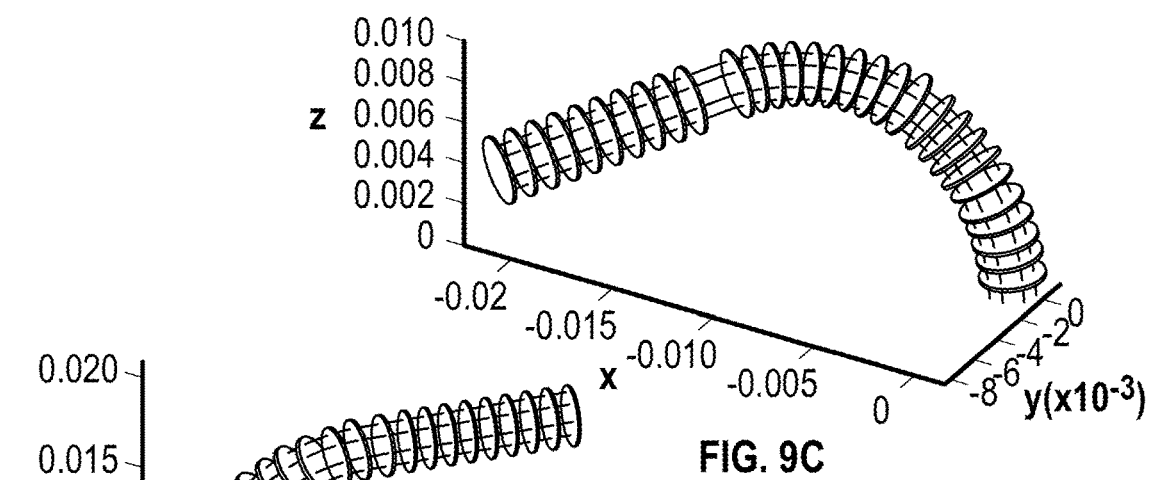
FIG. 9C is a diagram for illustrating still another example of the curve shape of the continuum robot illustrated in FIG. 7.
Figure 9D:
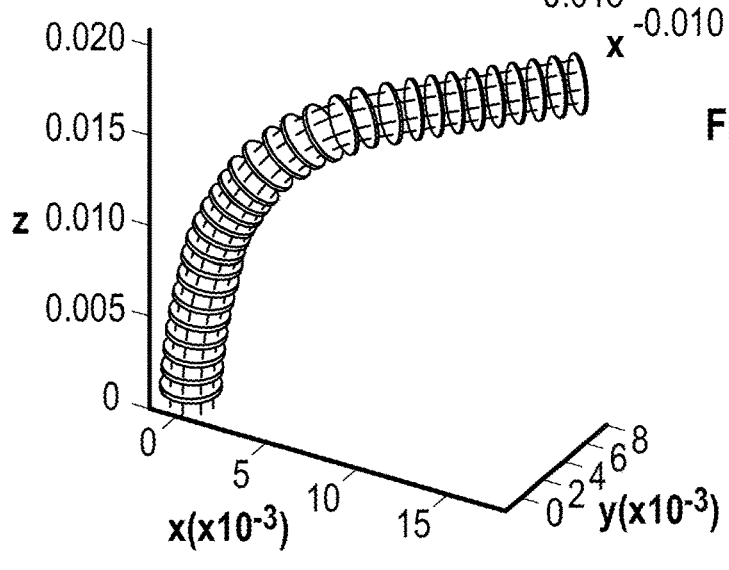
FIG. 9D is a diagram for illustrating yet still another example of the curve shape of the continuum robot illustrated in FIG. 7.
Figure 10:
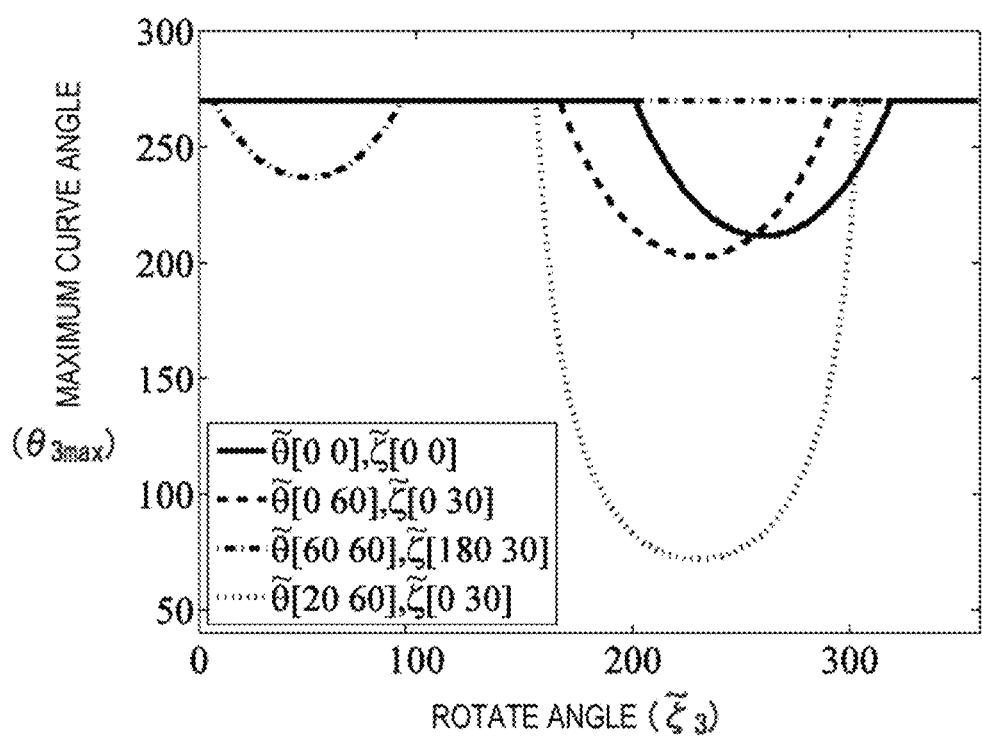
FIG. 10 is a graph for showing the result of simulating a relation between each rotation angle and a maximum curve angle in the second embodiment of this disclosure.

In the case of the curve-shape parameters of the patterns a) and b), which are indicated by the solid line and the broken line, respectively, in FIG. 10, it is understood that the maximum curve angle $\theta_{3max}$ of the third curvable portion 1340 and the rotation angle $\zeta_3$ at which the maximum curve angle $\theta_{3max}$ has the smallest value vary due to the curving of the second curvable portion 1330. In the case of the curve-shape parameters of the pattern c), which is indicated by the dot-dash line in FIG. 10, the smallest value of the maximum curve angle $\theta_{3max}$ of the third curvable portion 1340 is large because the continuum robot is in a posture that makes the central axis of the third curvable portion 1340 long as can be seen in FIG. 9C, although the first curvable portion 1320 is driven in addition to the second curvable portion. In the case of the curve-shape parameters of the pattern d), which is indicated by the dotted line in FIG. 10, on the other hand, the smallest value of the maximum curve angle $\theta_{3max}$ of the third curvable portion 1340 is small because the first curvable portion 1320 is driven so as to curve in a reverse direction, thereby making the central axis of the third curvable portion 1340 short. The maximum curve angle ($\theta_{3max}$) thus varies non-linearly depending on the shape of every curvable portion, and is consequently difficult to restrict with a fixed value, which is why the kinematic model-based contact avoidance control used in the second embodiment is effective. In the simulation conducted here, a gap of 0.0008 m is set between the distal end of the first wire guide of the n-th curvable portion and the proximal end of the second wire guide of the (n+1)-th curvable portion, which is closest to this distal end, when the continuum robot is in an erect posture in order to show the effect of the control. The severeness of restriction on the curve posture is lessened by setting the gap to a large value.

As described above, the switch determination unit 222 in the second embodiment performs control (drive control) with respect to whether the section of the wire 1302 and the section of the wire 1303 by the drive displacement amount of the section of the wire 1302 and the drive displacement amount of the section of the wire 1303, which are calculated along with the coordinate values $z_{e1}(\theta_e)$ ... $z_{ee}(\theta_e)$ by the kinematic model arithmetic portion 121, for the respective curvable portions based on the coordinate values $z_{e1}(\theta_e)$ ... $z_{ee}(\theta_e)$ calculated by the kinematic model arithmetic portion 221.

According to this configuration of the second embodiment, a contact between a member that serves as a reference surface for the curve shape of each curvable portion of the continuum robot 230 (the base unit 1310 or the first wire guide) and a member in the curvable portion that is closest to the reference surface (the second wire guide) can be prevented when, for example, the curvable portion is driven along the insertion/extraction path 400 (more specifically, when, for example, the curvable portion is driven while avoiding a contact with the insertion/extraction path 400).

Third Embodiment

A third embodiment of this disclosure is described next. The following description of the third embodiment focuses on differences from the first and second embodiments, and a description on the same part as that of the first and second embodiments is omitted.

<Configuration Example of a Continuum Robot Control System>

Figure 11:
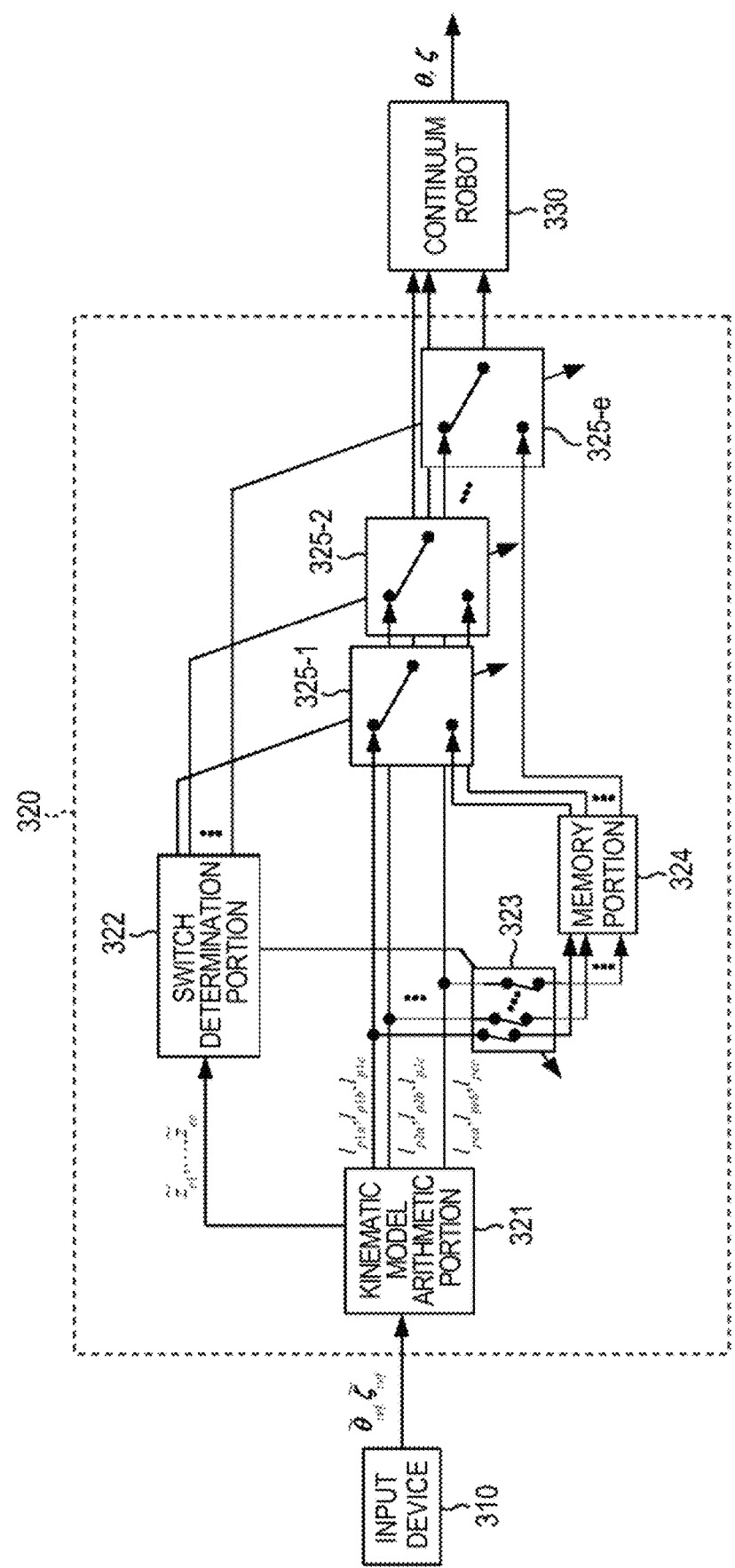
FIG. 11 is a schematic diagram for illustrating an example of the configuration of a continuum robot control system according to a third embodiment of this disclosure.

FIG. 11 is a schematic diagram for illustrating an example of the configuration of a continuum robot control system 300 according to a third embodiment of this disclosure. The continuum robot control system 300 includes, as illustrated in FIG. 11, an input device 310, a control device 330, and a continuum robot 330.

An example of the configuration of the continuum robot 330 illustrated in FIG. 11 is described first.

In the second embodiment (as well as the first embodiment), a part of the three wires 1301 to 1303, here, the wires 1302 and 1303, are driven as predetermined wires in each curvable portion while fixing wires that are not the predetermined wires, here, the wire 1301. The third embodiment is a mode in which the wire 1301 illustrated in FIG. 2 or FIG. 8 is driven as well. In other words, the third embodiment is a mode in which all of the three wires 1301 to 1303 are driven as predetermined wires in each curvable portion. The third embodiment employs a mode in which an actuator having the same function as that of the actuator 1311 and the actuator 1312, which are illustrated in FIG. 2, is connected to one end of the wire 1301 illustrated in FIG. 2 or FIG. 8 in the interior of the base unit 1310, and is controlled in addition to the other actuators. In the third embodiment, the wires can be driven so that the length of the central axis of a curvable portion is kept constant irrespective of the curve shape. However, when the length of the central axis 1304 of each curvable portion is to be varied separately, the drive control described in the first embodiment and the second embodiment in which kinematic models are used to avoid contact is effective.

In the continuum robot control system 300 illustrated in FIG. 11, the wire 1301 of the continuum robot 230 of the second embodiment illustrated in FIG. 8 is driven in addition to the other wires. An example of this case is described below.

The input device 310 inputs, to the control device 320, for each of e curvable portions, a target curve angle $\theta_{ref}$ and a target rotation angle $\zeta_{ref}$ which are curve-shape parameters of the curvable portion. The target curve angle $\theta_{ref}$ is a target value of the curve angle $\theta$ of the curvable portion. The target rotation angle $\zeta_{ref}$ is a target value of the rotation angle $\zeta$ of the curvable portion. The input target curve angle $\theta_{ref}$ and target rotation angle $\tilde{\zeta}_{ref}$ belong to the relative coordinate system described in the second embodiment. The symbol "~" indicating that a value belongs to a relative coordinate system is accordingly attached above the symbol letter of each of the target curve angle $\theta_{ref}$ and the target rotation angle $\theta_{ref}$. The input device 310 is configured so that the curve-shape parameters, which include the target curve angle $\theta_{ref}$ and the target rotation angle $\zeta_{ref}$, can be input sequentially in time series (e.g., for every predetermined discrete-time step). The curve-shape parameters input sequentially in time series by the input device 310 may include the target curve angle $\theta_{ref}$ and target rotation angle $\zeta_{ref}$ of different values.

The control device 320 controls the drive of the continuum robot 320 based on curve-shape parameters input for each curvable portion from the input device 310. The control device 320 includes, as illustrated in FIG. 11, a kinematic model arithmetic portion 321, a switch determination unit 322, a third switch portion 323, a memory portion 324, and second switch portions 325-1 to 325-e. Specifically, the control device 320 derives a kinematic model for the continuum robot 330 whose shape can be controlled three-dimensionally by driving the three wires 1301 to 1303 for each curvable portion separately. The control device 320 performs control for each curvable portion to avoid a contact between the reference surface of the curvable portion and the proximal end of a second wire guide that is closest to this reference surface.

The kinematic model arithmetic portion 321 calculates, from the target curve angles $\theta_{ref}$ and target rotation angles $\zeta_{ref}$ of the respective curvable portions input from the input device 310, drive displacement amounts $l_{p1a}, l_{p2a} \ldots l_{pea}$ of the sections of the wire 1301, drive displacement amounts $l_{p1b}, l_{p2b} \ldots l_{peb}$ of the sections of the wire 1302, and drive displacement amounts $l_{p1c}, l_{p2c} \ldots l_{pec}$ of the sections of the wire 1303. The kinematic model arithmetic portion 321 also calculates coordinate values $z_{e1}(\theta_e) \ldots z_{ee}(\theta_e)$ from the target curve angles $\theta_{ref}$ and target rotation angles $\zeta_{ref}$ of the respective curvable portions input from the input device 310. The coordinate values $z_{e1}(\theta_e) \ldots z_{ee}(\theta_e)$ are each a piece of distance information indicating the distance between a reference surface and the proximal end of a second wire guide that is closest to the reference surface. The coordinate values $z_{e1}(\theta_e) \ldots z_{ee}(\theta_e)$ calculated here belong to the relative coordinate system described in the second embodiment. The symbol "~" indicating that a value belongs to a relative coordinate system is accordingly attached above "z" in the coordinate values $z_{e1}(\theta_e) \ldots z_{ee}(\theta_e)$. The kinematic model arithmetic portion 321 configured to calculate the drive displacement amounts $l_{p1a}, l_{p2a} \ldots l_{pea}$, the drive displacement amounts $l_{p1b}, l_{p2b} \ldots l_{peb}$, the drive displacement amounts $l_{p1c}, l_{p2c} \ldots l_{pec}$, and the coordinate values $z_{e1}(\theta_e) \ldots z_{ee}(\theta_e)$ is an example of a component corresponding to the "calculation unit" of this disclosure.

The switch determination unit 322 performs control (drive control), for each curvable portion, with respect to whether to drive the relevant section of the wire 1301, the relevant section of the wire 1302, and the relevant section of the wire 1303 by the relevant drive displacement amount of the section of the wire 1301, the relevant drive displacement amount of the section of the wire 1302, and the relevant drive displacement amount of the section of the wire 1303 out of the drive displacement amounts $l_{p1a}, l_{p2a} \ldots l_{pea}$, the drive displacement amounts $l_{p1b}, l_{p2b} \ldots l_{peb}$, and the drive displacement amounts $l_{p1c}, l_{p2c} \ldots l_{pec}$, which are calculated along with the coordinate values $z_{e1}(\theta_e) \ldots z_{ee}(\theta_e)$ by the kinematic model arithmetic portion 321, based on the relevant one of the coordinate values $z_{e1}(\theta_e) \ldots z_{ee}(\theta_e)$ calculated by the kinematic model arithmetic portion 321. Specifically, the switch determination unit 322 determines, for each curvable portion, whether or not the relevant one of the coordinate values $z_{e1}(\theta_e) \ldots z_{ee}(\theta_e)$ is equal to or less than a threshold value, and performs the drive control described above based on the determination. When the threshold value is set to 0, for example, and the coordinate value of one of the curvable portions is equal to or less than the threshold value 0, a contact is expected to occur between the reference surface of the curvable portion and the proximal end of a second wire guide that is closest to this reference surface. As a way to determine whether a reference surface and the proximal end of a second wire guide that is closest to the reference surface is a possibility, it is preferred to set the threshold value to 0. However, this disclosure is not limited to this mode, and may also employ a mode in which a predetermined positive value is set as the threshold value by taking into consideration the safety rate related to the contact.

When one of the coordinate values $z_{e1}(\theta_e) \ldots z_{ee}(\theta_e)$ calculated for the respective curvable portions is not equal to or less than the threshold value, the switch determination unit 322 determines that there is no fear of contact between the reference surface of the relevant curvable portion and the proximal end of a second wire guide that is closest to this reference surface. The switch determination unit 322 in this case makes switches in the first switch portion 323 associated with this curvable portion and one of the second switch portions 325 (325-1 to 325-e) that is associated with this curvable portion in the manner illustrated in FIG. 11. Specifically, the switch determination unit 325 makes a switch in one of the second switch portions 325 that is associated with this curvable portion in the manner illustrated in FIG. 11 to perform control so that drive displace amounts calculated for the relevant section of the wire 1301, the relevant section of the wire 1302, and the relevant section of the wire 1303 along with the one of the coordinate values by the kinematic model arithmetic portion 321 are output to the continuum robot 330. This causes the continuum robot 330 to drive the section of the wire 1301, the section of the wire 1302, and the section of the wire 1303 by the drive displacement amount of the section of the wire 1301, the drive displacement amount of the section of the wire 1302, and the drive displacement amount of the section of the wire 1303, which are calculated along with the one of the coordinate values by the kinematic model arithmetic portion 321. The switch determination unit 322 in this case also makes a switch in the first switch portion 323 associated with this curvable portion in the manner illustrated in FIG. 11 to perform control so that the drive displacement amounts calculated for the section of the wire 1301, the section of the wire 1302, and the section of the wire 1303 along with the one of the coordinate values by the kinematic model arithmetic portion 321 are stored in the memory portion 324. The memory portion 324 thus stores, when one of the coordinate values described above is not equal to or less than the threshold value (i.e., when it is determined that there is no fear of contact), drive displacement amounts calculated for a section of the wire 1301, a section of the wire 1302, and a section of the wire 1303 by the kinematic model arithmetic portion 321 along with the coordinate value.

When one of the coordinate values $z_{e1}(\theta_e) \ldots z_{ee}(\theta_e)$ calculated for the respective curvable portions is equal to or less than the threshold value, on the other hand, the switch determination unit 322 determines that there is a fear of contact between the reference surface of the relevant curvable portion and the proximal end of a second wire guide that is closest to this reference surface. The switch determination unit 322 in this case makes switches in the first switch portion 323 associated with this curvable portion and one of the second switch portions 325 (325-1 to 325-*e*) that is associated with this curvable portion in a direction reverse to the direction illustrated in FIG. 11. In other words, the switch determination unit 322 in this case performs control so that the relevant section of the wire 1301, the relevant section of the wire 1302, and the relevant section of the wire 1303 are not driven by the drive displacement amount of the section of the wire 1301, the drive displacement amount of the section of the wire 1302, and the drive displacement amount of the section of the wire 1303, which are calculated along with the one of the coordinate values by the kinematic model arithmetic portion 321. Specifically, the switch determination unit 322 first makes a switch in the first switch portion 323 associated with this curvable portion in a direction reverse to the direction illustrated in FIG. 11 to perform control so that the drive displacement amounts calculated for the section of the wire 1301, the section of the wire 1302, and the section of the wire 1303 by the kinematic model arithmetic portion 321 along with the one of the coordinate values are not stored in the memory portion 324. This ensures that the memory portion 324 stores drive displacement amounts calculated for a section of the wire 1301, a section of the wire 1302, and a section of the wire 1303 by the kinematic model arithmetic portion 321 along with the coordinate value of one of the curvable portions only when the coordinate value is not equal to or less than the threshold value (i.e., only when it is determined that there is no fear of contact). The switch determination unit 322 then makes a switch in one of the second switch portions 325 that is associated with this curvable portion in a direction reverse to the direction illustrated in FIG. 11 to perform control so that the drive displacement amounts calculated for the section of the wire 1301, the section of the wire 1302, and the section of the wire 1303 along with the one of the coordinate values by the kinematic model arithmetic portion 321 are not output to the continuum robot 330. This prevents the section of the wire 1301, the section of the wire 1302, and the section of the wire 1303 in the continuum robot 330 from being driven by the drive displacement amounts calculated for the section of the wire 1301, the section of the wire 1302, and the section of the wire 1303 along with the one of the coordinate values by the kinematic model arithmetic portion 321, with the result that the contact described above is avoided. To give a more detailed description, the switch determination unit 322 in this case makes a switch in one of the second switch portions 325 that is associated with this curvable portion in a direction reverse to the direction illustrated in FIG. 11 to perform control so that the drive displacement amounts that are stored in the memory portion 324 as values calculated for the section of the wire 1301, the section of the wire 1302, and the section of the wire 1303 along with the coordinate value of the curvable portion by the kinematic model arithmetic portion 321 at a previous time when the coordinate value calculated by the kinematic model arithmetic portion 321 is not equal to or less than the threshold value (i.e., when it is determined that there is no fear of contact) are output to the continuum robot 330. This causes the continuum robot 330 to drive each curvable portion while avoiding the contact described above.

The memory portion 324 in the third embodiment stores, for each curvable portion, predetermined drive displacement amounts calculated by the kinematic model arithmetic portion 321. However, this disclosure is not limited to this mode and may also employ, for example, a mode in which, for each curvable portion, the drive displacement amounts of the relevant section of the wire 1301, the relevant section of the wire 1302, and the relevant section of the wire 1303 that are verified to be effective in avoiding the contact described above are stored in advance instead of drive displacement amounts calculated by the kinematic model arithmetic portion 321. The switch determination unit 322 is an example of a component corresponding to the "determination unit" of this disclosure.

The kinematic model arithmetic portion 321, switch determination unit 322, third switch portion 323, memory portion 324, and second switch portions 325-1 to 325-*e* of the control device 320 illustrated in FIG. 11 may be hardware components or software components. When the constituent portions 321 to 325 of the control device 320 illustrated in FIG. 11 are software components, functions of the constituent portions 321 to 325 are implemented by, for example, a CPU of a computer by executing a program stored in a ROM or other storage media.

A specific processing example of the control device 320 is described next.

The following description deals with a case in which the continuum robot 330 is provided with n curvable portions.

In the third embodiment, a relation between the curve angle of the n-th curvable portion and the coordinates of the distal end of the first wire guide in the n-th curvable portion is derived first. When the length of the central axis of the n-th curvable portion is given as $l_{nd}$, the coordinates of the distal end of the first wire guide of the n-th curvable portion in a relative coordinate system $(x_n, y_n, z_n)$ are expressed by Expression (59) to Expression (61).

When the length of the central axis of the n-th curvable portion is given as $l_{nd}$, the coordinates $(\tilde{x}_{tn}, \tilde{y}_{tn}, \tilde{z}_{tn})$ of the distal end of the n-th curvable portion in the relative coordinate system $(x_n, y_n, z_n)$ are expressed by the following expressions:

$$\tilde{x}_{tn} = \frac{l_{nd}}{\theta_n}(1 - \cos\theta_n)\cos(\zeta_n + \xi_n) \tag{59}$$

$$\tilde{y}_{tn} = \frac{l_{nd}}{\theta_n}(1 - \cos\theta_n)\sin(\zeta_n + \xi_n) \tag{60}$$

$$\tilde{z}_{tn} = \frac{l_{nd}}{\theta_n}\sin\theta_n \tag{61}$$

Coordinates $(x_{tn}, y_{tn}, z_{tn})$ of the distal end of the first wire guide of the n-th curvable portion in an absolute coordinate system are accordingly expressed by Expression (62) with the use of a rotational transform matrix.

$$\begin{bmatrix} x_{tn} \\ y_{tn} \\ z_{tn} \end{bmatrix} = \begin{bmatrix} \tilde{x}_{t1} \\ \tilde{y}_{t1} \\ \tilde{z}_{t1} \end{bmatrix} + \sum_{m=2}^{n} \prod_{k=1}^{m-1} R_z(\zeta_k + \xi_k) R_y(\theta_k) \begin{bmatrix} \tilde{x}_{tm} \\ \tilde{y}_{tm} \\ \tilde{z}_{tm} \end{bmatrix} \tag{62}$$

Coordinates in a relative coordinate system that are given below are obtained as outer circumferential coordinates of the proximal end of a second wire guide at a length $l_{en}$ from the center of the distal end of the first wire guide of the n-th curvable portion. The central coordinates of this second wire guide are given below.

Coordinates $(\tilde{x}_{en}, \tilde{y}_{en}, \tilde{z}_{en})$ in a relative coordinate system are obtained.

The central coordinates of the wire guide are given as $(\tilde{x}_{en0}, \tilde{y}_{en0}, \tilde{z}_{en0})$.

Expression (63) is then defined.

$$l_{wn} = l_{nd} - l_{en}, \tilde{\theta}_{wn} = \frac{l_{wn}}{l_{nd}} \theta_n \quad (63)$$

The central coordinates of the second wire guide described above are in this case expressed by Expression (64) to Expression (66).

$$\tilde{x}_{en0} = \frac{l_{wn}}{\tilde{\theta}_{wn}}(1 - \cos\tilde{\theta}_{wn})\cos\zeta_n \quad (64)$$

$$\tilde{y}_{en0} = \frac{l_{wn}}{\tilde{\theta}_{wn}}(1 - \cos\tilde{\theta}_{wn})\sin\zeta_n \quad (65)$$

$$\tilde{z}_{en0} = \frac{l_{wn}}{\tilde{\theta}_{wn}}\sin\tilde{\theta}_{wn} \quad (66)$$

The outer circumferential coordinates in the relative coordinate system of the proximal end of the second wire guide at the length $l_{en}$ from the center of the distal end of the first wire guide of the n-th curvable portion are accordingly expressed by Expression (67).

$$\begin{bmatrix} \tilde{x}_{en} \\ \tilde{y}_{en} \\ \tilde{z}_{en} \end{bmatrix} = \begin{bmatrix} \tilde{x}_{en0} \\ \tilde{y}_{en0} \\ \tilde{z}_{en0} \end{bmatrix} + R_z(\tilde{\zeta}_n)R_y(\tilde{\theta}_n)\begin{bmatrix} r_{wy}\cos\theta_e \\ r_{wy}\sin\theta_e \\ 0 \end{bmatrix} \quad (67)$$

Relations of drive displacement amounts $l_{pna}$, $l_{pnb}$, and $l_{pnc}$ of the section of the wire 1301, the section of the wire 1302, and the section of the wire 1303, respectively, that are in the n-th curvable portion to a curve angle $\theta_n$ and rotation angle $\zeta_n$ of the n-th curvable portion are derived next, with n set to a value equal to or more than 2. The drive displacement amounts of the section of the wire 1301, the section of the wire 1302, and the section of the wire 1303 in the relative coordinate system $(x_n, y_n, z_n)$ have relations expressed by Expression (68) to Expression (70) with the curve angle of the first curvable portion.

The relation between the wire drive displacement amount $\tilde{l}_{pn}$ and the angle $\tilde{\theta}_n$ of the distal end of the first curvable portion in the relative coordinate system $(x_n, y_n, z_n)$ is as follows:

$$\tilde{l}_{pna} = \frac{r_s}{\sqrt{3}}\cos(\tilde{\zeta}_n - \xi_n)\tilde{\theta}_n \quad (68)$$

$$\tilde{l}_{pnb} = \frac{r_s}{\sqrt{3}}\cos\left(\frac{\pi}{6} + \tilde{\zeta}_n - \xi_n\right)\tilde{\theta}_n \quad (69)$$

$$\tilde{l}_{pnc} = \frac{r_s}{\sqrt{3}}\cos\left(\frac{\pi}{6} - \tilde{\zeta}_n + \xi_n\right)\tilde{\theta}_n \quad (70)$$

A drive displacement amount $l_{pna}$ of a section of the wire 1301, the drive displacement amount $l_{pnb}$ of a section of the wire 1302, and the drive displacement amount $l_{pnc}$ of a section of the wire 1303 in the n-th curvable portion are each the sum of displacement amounts of wire sections from the first curvable portion to the (n−1)-th curvable portion for driving the n-th curvable portion in the relative coordinate system, and are expressed by Expression (71).

$$l_{pna} = \sum_{m=1}^{n} \tilde{l}_{pma}, \, l_{pnb} = \sum_{m=1}^{n} \tilde{l}_{pmb}, \, l_{pnc} = \sum_{m=1}^{n} \tilde{l}_{pmc} \quad (71)$$

In the example of FIG. 11, the continuum robot control system 300 according to the third embodiment drives the wire 1301 of the continuum robot 230, which is illustrated in FIG. 8 as a continuum robot of the second embodiment, in addition to the other wires. However, this disclosure is not limited to this mode and may employ, for example, a mode in which the continuum robot control system 300 according to the third embodiment drives the wire 1301 of the continuum robot 130, which is illustrated in FIG. 2 as a continuum robot of the first embodiment, in addition to the other wires.

As described above, the switch determination unit 322 in the third embodiment performs control (drive control) for each curvable portion with respect to whether to drive the relevant section of the wire 1301, the relevant section of the wire 1302, and the relevant section of the wire 1303 by the drive displacement amount of the section of the wire 1301, the drive displacement amount of the section of the wire 1302, and the drive displacement amount of the section of the wire 1303, which are calculated along with the relevant one of the coordinate values $z_{e1}$ ($\theta_e$) ... $z_{ee}$ ($\theta_e$) by the kinematic model arithmetic portion 321, based on the one of the coordinate values calculated by the kinematic model arithmetic portion 321.

According to this configuration of the third embodiment, when each curvable portion of the continuum robot 330 is driven along, for example, the insertion/extraction path 400 (more specifically, when each curvable portion is driven while avoiding a contact with the insertion/extraction path 400, for example), a contact can be prevented between a member that serves as a reference surface for the curve shape of the curvable portion (the base unit 1310 or the first wire guide) and a member in the curvable portion that is closest to the reference surface (the second wire guide).

Fourth Embodiment

A fourth embodiment of this disclosure is described next.

The second embodiment and third embodiment described above deal with a case in which a relative coordinate system is introduced for each of a plurality of curvable portions included in a continuum robot to derive a kinematic model and to design a control system. Control in the fourth embodiment involves the avoidance of a contact of a second wire guide with the use of an absolute coordinate system.

Steps of obtaining the curve angle $\theta_n$ and rotation angle $\zeta_n$ of the n-th curvable portion in an absolute coordinate system from a relative angle are described first.

When $x_{ttn}$, $y_{ttn}$, and $z_{ttn}$ are set at a length of 1 from the distal end on extended lines of the curve shape in a relative coordinate system of the n-th curvable portion, coordinates $(x_{ttn}, y_{ttn}, z_{ttn})$ are expressed by Expression (72), in which the symbol "~" indicating that a value belongs to a relative coordinate system is attached above the symbol letter of each of the coordinates.

When $x_{ttn}$, $y_{ttn}$, and $z_{ttn}$ are set at a length of 1 from the distal end on extended lines of the curve shape in the relative coordinate system of the n-th curvable portion, the coordinates $(\tilde{x}_{ttn}, \tilde{y}_{ttn}, \tilde{z}_{ttn})$ are as follows:

$$\begin{bmatrix} \tilde{x}_{ttn} \\ \tilde{y}_{ttn} \\ \tilde{z}_{ttn} \end{bmatrix} = \begin{bmatrix} \tilde{x}_{tn} \\ \tilde{y}_{tn} \\ \tilde{z}_{tn} \end{bmatrix} + \begin{bmatrix} \cos\zeta\sin\theta \\ \sin\zeta\sin\theta \\ \cos\theta \end{bmatrix} \quad (72)$$

The point $(x_{ttn}, y_{ttn}, z_{ttn})$ in an absolute coordinate system is expressed with the use of a rotational transform matrix by Expression (73).

$$\begin{bmatrix} x_{ttn} \\ y_{ttn} \\ z_{ttn} \end{bmatrix} = \begin{bmatrix} x_{t1} \\ y_{t1} \\ z_{t1} \end{bmatrix} + \sum_{m=2}^{n-1} \prod_{k=1}^{m-1} R_z(\zeta_k + \xi_k) R_y(\theta_k) \begin{bmatrix} \tilde{x}_{tm} \\ \tilde{y}_{tm} \\ \tilde{z}_{tm} \end{bmatrix} + \prod_{k=1}^{n} R_z(\zeta_n + \xi_n) R_y(\theta_n) \begin{bmatrix} \tilde{x}_{ttn} \\ \tilde{y}_{ttn} \\ \tilde{z}_{ttn} \end{bmatrix} \quad (73)$$

This is used to define a unit vector $e_{zn}$ expressed by Expression (74).

$$e_{zn} = (x_{ttn} - x_{tn}, y_{ttn} - y_{tn}, z_{ttn} - z_{tn}) \quad (74)$$

The unit vector $e_{zn}$ indicates the direction of the distal end of the n-th curvable portion in the absolute coordinate system. The angle of the unit vector $e_{zn}$ from the z-axis is the curve angle $\theta_n$. The angle of a projection of the unit vector $e_{zn}$ onto the x-y plane from the x-axis is the rotation angle $\zeta_n$. In order to obtain a relative angle from an absolute angle, a $z_{n+1}$-axis of a relative coordinate system of the (n+1)-th curvable portion is set in the direction of the unit vector $e_{zn}$, and an $x_{n+1}$-th axis is set in a direction orthogonal to the $z_{n+1}$-axis on a $w_n$-$z_n$ plane in the relative coordinate system of the n-th curvable portion. The relative coordinate system of the (n+1)-th curvable portion is defined by a right-hand system, and the relative angle is accordingly obtained from relations of the unit vector $e_{zn}$ to coordinate axes. The first curvable portion has a relative angle and an absolute angle that are equal to each other, which means that the relative angle of every curvable portion can be obtained by repeating this from the proximal end.

The drive displacement amount $l_{pnb}$ of a section of the wire 1302 that is in the n-th curvable portion and the drive displacement amount $l_{pnc}$ of a section of the wire 1303 that is in the n-th curvable portion are expressed with the use of the absolute coordinate system by Expression (75) and Expression (76).

$$l_{pnb} = r_s \cos\left(\frac{\pi}{6} + \zeta_n - \xi_n\right)\theta_n \quad (75)$$

$$l_{pnc} = r_s \cos\left(\frac{\pi}{6} - \zeta_n + \xi_n\right)\theta_n \quad (76)$$

This does not require rotational transform as the one in the second embodiment, and is accordingly small in calculation amount. In addition, control using an absolute coordinate system is simple in control that makes the angle of the most distal curvable portion follow a path set in an absolute coordinate system. In order to avoid a contact of a second wire guide, however, it is required to obtain a relative angle from an absolute angle through the steps described above and to execute the contact determination described in the second embodiment, which is large in calculation amount. To address this, a simple method of avoiding a contact of a second wire guide in an absolute coordinate system is described below.

A case is considered in which the curve angle $\theta_n$ of the n-th curvable portion is restricted to a curve angle $\tilde{\theta}_{lim}$ in the relative coordinate system of the n-th curvable portion in order to avoid the contact with the (n−1)-th curvable portion and the n-th curvable portion, which are two adjacent curvable portions. When a rotation angle $\zeta_{n-1}$ and the rotation angle $\zeta_n$ are equal to each other, for example, a restriction expressed by Expression (77) is put on a curve angle difference $(\theta_n - \theta_{n-1})$.

$$-\tilde{\theta}_{lim} < \theta_n - \theta_{n-1} < \tilde{\theta}_{lim} \quad (77)$$

When the rotation angle $\zeta_{n-1}$ and the rotation angle $\zeta_n$ differ from each other by, for example, 90 degrees, on the other hand, a restriction expressed by Expression (78) is put on the curve angle difference.

$$-\tilde{\theta}_{lim} < \theta_n < \tilde{\theta}_{lim} \quad (78)$$

A function a having a rotation angle difference $(\zeta_n - \zeta_{n-1})$ as an argument and expressed by Expression (79) is introduced, and the curve angle $\theta_n$ is restricted in a manner indicated by Expression (80).

$$\alpha = \cos(((\zeta_n - \zeta_{n-1}) \bmod 2\pi)) \quad (79)$$

$$-\tilde{\theta}_{lim} + \alpha\theta_{n-1} < \theta_n < \tilde{\theta}_{lim} + \alpha\theta_{n-1} \quad (80)$$

In this manner, a contact between wire guides of adjacent curvable portions can be avoided in an absolute coordinate system as well.

Other Embodiments

This disclosure can also be carried out by supplying a program for implementing at least one of the functions of the embodiments described above to a system or a device over a network or via a storage medium, and by reading and executing the program with the use of at least one processor in the system or the device. This disclosure can also be carried out by a circuit (for example, ASIC) for implementing at least one of the functions.

The program and a computer-readable storage medium on which the program is stored are included in this disclosure.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The embodiments of this disclosure described above are all merely examples of how this disclosure can specifically be embodied, and are not to limit the interpretation of the technical scope of this disclosure. In other words, this disclosure can be carried out in various forms without departing from the technical concept or main characteristics of this disclosure.

According to this disclosure, a contact between a member that serves as a reference surface for the curve shape of a curvable portion of a continuum robot and a member in the curvable portion that is closest to the reference surface can be prevented when the curvable portion is driven.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-084877, filed Apr. 21, 2017, which is hereby incorporated by reference herein in its entirety.

What is claimed is:

1. A continuum robot comprising:
a base portion;
a distal curvable portion that is curvable by driving a distal wire;
a follow curvable portion adjacent the distal curvable portion, located near the base portion with respect to the distal curvable portion, and that is curvable by driving a follow wire;
a drive portion configured to drive the distal wire for the distal curvable portion and the follow wire for the follow curvable portion, respectively; and
a control device configured to control the drive portion, wherein in a case of receiving a curving command for curving the distal curvable portion and the follow curvable portion, the control device controls the drive portion to drive the distal wire and the follow wire so that a curve angle of the distal curvable portion relative to the follow curvable portion is within a predetermined range in order to avoid a contact with the distal curvable portion and the follow curvable portion.

2. The continuum robot according to claim 1, wherein when a rotation angle of the follow curvable portion is equal to a rotation angle of the distal curvable portion, the drive portion drives the distal wire and the follow wire so that a difference between a curve angle of the distal curvable portion and a curve angle of the follow curvable portion becomes smaller than a curve angle of the distal curvable portion in a coordinate where a plane of distal end of the follow curvable portion is set as a reference plane.

3. The continuum robot according to claim 1, wherein when a difference between a rotation angle of the follow curvable portion and the distal curvable portion is 90 degrees, a drive portion drives the distal wire and the follow wire so that a curve angle of the distal curvable portion becomes smaller than a curve angle of the distal curvable portion in a coordinate where a plane of distal end of the follow curvable portion is set as a reference plane.

4. The continuum robot according to claim 1, comprising a plurality of distal wires and a plurality of follow wires, and
wherein the drive portion curves the distal curvable portion by driving at least a part of the plurality of distal wires, and curves the follow curvable portion by driving at least a part of the plurality of follow wires.

5. A continuum robot control method for controlling a continuum robot, the continuum robot including
a base portion;
a distal curvable portion that is curvable by driving a distal wire;
a follow curvable portion adjacent the distal curvable portion, located near the base portion with respect to the distal curvable portion, and that is curvable by driving a follow wire;
a drive portion configured to drive the distal wire for the distal curvable portion and the follow wire for the follow curvable portion, respectively; and
a control device configured to control the drive portion, wherein the control device executes steps by controlling the drive portion, the steps comprising:
receiving a curving command for curving the distal curvable portion and the follow curvable portion; and
driving by the drive portion the distal wire and the follow wire so that a curve angle of the distal curvable portion relative to the follow curvable portion is within a predetermined range in order to avoid a contact with the distal curvable portion and the follow curvable portion.

6. A non-transitory tangible medium having recorded thereon a program for causing a computer to perform steps of the control method according to claim 5.

* * * * *